United States Patent
Young et al.

(10) Patent No.: US 11,858,826 B2
(45) Date of Patent: Jan. 2, 2024

(54) LAYERED HYDROXIDES AS ANION INSERTION MATERIALS

(71) Applicant: UCHICAGO ARGONNE, LLC, Chicago, IL (US)

(72) Inventors: Matthias J. Young, Lemont, IL (US); Jeffrey W. Elam, Lemont, IL (US)

(73) Assignee: UChicago Argonne, LLC, Chicago, IL (US)

(*) Notice: Subject to any disclaimer, the term of this patent is extended or adjusted under 35 U.S.C. 154(b) by 845 days.

(21) Appl. No.: 16/425,771

(22) Filed: May 29, 2019

(65) Prior Publication Data
US 2020/0377388 A1    Dec. 3, 2020

(51) Int. Cl.
| | |
|---|---|
| C01F 7/18 | (2006.01) |
| C01G 51/04 | (2006.01) |
| H01M 4/04 | (2006.01) |
| H01M 4/505 | (2010.01) |
| H01M 4/485 | (2010.01) |
| H01M 4/48 | (2010.01) |
| H01M 4/525 | (2010.01) |
| H01M 4/32 | (2006.01) |
| H01M 8/18 | (2006.01) |
| C02F 1/461 | (2023.01) |
| C02F 1/46 | (2023.01) |
| C02F 103/08 | (2006.01) |

(52) U.S. Cl.
CPC ........... *C01F 7/18* (2013.01); *C01G 51/04* (2013.01); *H01M 4/0402* (2013.01); *H01M 4/32* (2013.01); *H01M 4/48* (2013.01); *H01M 4/485* (2013.01); *H01M 4/505* (2013.01); *H01M 4/525* (2013.01); *H01M 8/188* (2013.01); *C01P 2002/72* (2013.01); *C01P 2006/40* (2013.01); *C02F 1/4604* (2013.01); *C02F 1/46109* (2013.01); *C02F 2001/46133* (2013.01); *C02F 2103/08* (2013.01); *C02F 2201/46105* (2013.01); *H01M 4/04* (2013.01)

(58) Field of Classification Search
CPC ... C01F 7/00; C01F 7/18; C01G 51/00; C01G 51/006; C01G 51/04; C01P 2002/22; C01P 2002/72; C01P 2002/80; C01P 2002/84; C01P 2002/85; C01P 2004/04; C01P 2004/24; C01P 2006/40; C02F 1/4604; C02F 1/46109; C02F 2001/46133; C02F 2001/46138; C02F 2103/08; C02F 2201/46105; C02F 2305/08; H01M 4/04; H01M 4/0402; H01M 4/32; H01M 4/48; H01M 4/485; H01M 4/505; H01M 4/525; H01M 8/188
See application file for complete search history.

(56) References Cited

U.S. PATENT DOCUMENTS

2017/0222242 A1* 8/2017 Kamada ............... H01B 1/06

OTHER PUBLICATIONS

U.S. Appl. No. 62/418,534, filed Nov. 7, 2016, Matthias J. Young.
Alkauskas & Pasquarello, "Band-edge problem in the theoretical determination of defect energy levels: The O vacancy in ZnO as a benchmark case," Physical Review B 84, 125206, 12 pages (2011).
Aoun, "Fullrmc, a rigid body reverse monte carlo modeling package enabled with machine learning and artificial intelligence," Journal of Computational Chemistry 37(12), pp. 1102-1111 (2016).
Billinge & Kanatzidis, "Beyond crystallography: the study of disorder, nanocrystallinity and crystallographically challenged materials with pair distribution functions," Chemical Communications 0, pp. 749-760 (2004).
Blochl, "Projector augmented-wave method," Physical Review B 50(24), pp. 17953-17979 (1994).
Bloor, et al., "Low pH Electrolytic Water Splitting Using Earth-Abundant Metastable Catalysts That Self-Assemble in Situ," Journal of the American Chemical Society 136(8), pp. 3304-3311 (2014).
Brown & Gastuche, "Mixed Magnesium-Aluminium Hydroxides II. Structure and Structural Chemistry of Synthetic Hydroxycarbonates and Related Minerals and Compounds," Clay Minerals 7, pp. 193-201 (1967).
Buluswar, et al., "50 Breakthroughs—Critical scientific and technological advances needed for sustainable global development," Institute for Transformative Technologies, pp. 1-22 (2014).
Carrado, et al., "Layered double hydroxides (LDHs)," Solid State Ionics 23(2), pp. 77-86 (1988).
Costantino, et al., "Ion exchange and intercalation properties of layered double hydroxides towards halide anions," Dalton Transactions 43, pp. 11587-11596 (2014).
Dong, et al., "Rational design of cobalt-chromium layered double hydroxide as a highly efficient electrocatalyst for water oxidation," Journal of Materials Chemistry A 4, pp. 11292-11298 (2016).
Droog & Huisman, "Electrochemical formation and reduction of silver oxides in alkaline media," Journal of Electroanalytical Chemistry and Interfacial Electrochemistry 115(2), pp. 211-224 (1980).
Fabrega, et al., "Silver nanoparticles: Behaviour and effects in the aquatic environment," Environment International 37(2), pp. 517-531 (2011).
Gastuche, et al., "Mixed Magnesium-Aluminium Hydroxides: I. Preparation and Characterization of Compounds Formed in Dialysed Systems," Clay Minerals 7, pp. 177-192 (1967).

(Continued)

*Primary Examiner* — Adam A Arciero
(74) *Attorney, Agent, or Firm* — Foley & Lardner LLP

(57) ABSTRACT

Further described herein are extensions to the basic concept of LHs as electrode materials, include both new materials for use with LHs and higher order poly-layer hydroxides (PLHs) as well as methods for synthesizing improved LH material such as with conductive supports or through the use of cross-linking. Finally, also described herein are embodiments enabling the use of LHs as flow electrodes as well as the use of 2-d LH materials for surface redox reactions.

16 Claims, 16 Drawing Sheets

(56) References Cited

OTHER PUBLICATIONS

Gelinas, et al., "Electrochemical and Transport Properties of Ions in Mixtures of Electroactive Ionic Liquid and Propylene Carbonate with a Lithium Salt for Lithium-Ion Batteries," The Journal of Physical Chemistry C 120(10), pp. 5315-5325 (2016).

Gong, et al., "An Advanced Ni—Fe Layered Double Hydroxide Electrocatalyst for Water Oxidation," Journal of the American Chemical Society 135(23), pp. 8452-8455 (2013).

Islam & Fisher, "Lithium and sodium battery cathode materials: computational insights into voltage, diffusion and nanostructural properties," Chemical Society Reviews 43, pp. 185-204 (2014).

Juhas, et al., "PDFgetX3: a rapid and highly automatable program for processing powder diffraction data into total scattering pair distribution functions," Journal of Applied Crystallography 46, pp. 560-566 (2013).

Khan & O'Hare, "Intercalation chemistry of layered double hydroxides: recent developments and applications," Journal of Materials Chemistry 12, pp. 3191-3198 (2002).

Kresse & Furthmuller, "Efficient iterative schemes for ab initio total-energy calculations using a plane-wave basis set," Physical Review B 54(16), pp. 11169-11186 (1996).

Kresse & Joubert, "From ultrasoft pseudopotentials to the projector augmented-wave method," Physical Review B 59, pp. 1758-1775 (1999).

Mefford, et al., "Anion charge storage through oxygen intercalation in LaMnO3 perovskite pseudocapacitor electrodes," Nature Materials 13, pp. 726-732 (2014).

Miyata, "Anion-Exchange Properties of Hydrotalcite-Like Compounds," Clays and Clay materials 31(4), pp. 305-311 (1983).

Miyata, "The Syntheses of Hydrotalcite-Like Compounds and Their Structures and Physico-Chemical Properties I: The Systems Mg2—Al3—NO3—, Mg2—Al3—Cl—, Mg2—Al3—ClO4—, Ni2—Al3—Ci- and Zn2—Al3—Cl—," Clays and Clay Minerals 23, pp. 369-375 (1975).

Nalawade, et al.,. "Layered double hydroxides: A review," Journal of Scientific and Industrial Research 68(4), pp. 267-272 (2009).

Nitta, et al., "Li-ion battery materials: Present and future," Materials Today 18(5), pp. 252-264 (2015).

Pasta, et al., "A Desalination Battery," Nano Letters 12(2), pp. 839-843 (2012).

Perdew, et al., "Generalized Gradient Approximation Made Simple," Physical Review Letters 77(18), pp. 3865-3868 (1996).

Petkov, "Nanostructure by high-energy X-ray diffraction," Materials Today 11(11), pp. 28-38 (2008).

Porada, et al., "Review on the science and technology of water desalination by capacitive deionization," Progress in Materials Science 58(8), pp. 1388-1442 (2013).

Predew, et al., "Restoring the Density-Gradient Expansion for Exchange in Solids and Surfaces," Physical Review Letters 100(13), 136406, 4 pages (2008).

Raebiger, et al., "Charge self-regulation upon changing the oxidation state of transition metals in insulators," Nature 453, pp. 763-766 (2008).

Ravel & Newville, "Athena, Artemis, Hephaestus: data analysis for X-ray absorption spectroscopy using IFEFFIT," Journal of Synchrotron Radiation 12, pp. 537-541 (2005).

Ruffo, et al., "Electrochemical behavior of LiCoO2 as aqueous lithium-ion battery electrodes," Electrochemistry Communications 11(2), pp. 247-249 (2009).

Schimka, et al., "Improved hybrid functional for solids: The HSEsol functional," The Journal of Chemical Physics 134, 024116, 11 pages (2011).

Sels, et al., "Layered double hydroxides exchanged with tungstate as biomimetic catalysts for mild oxidative bromination," Nature 400, pp. 855-857 (1999).

Sideris, et al., "Mg/Al Ordering in Layered Double Hydroxides Revealed by Multinuclear NMR Spectroscopy," Scoemce 321(5885), pp. 113-117 (2008).

Song & Hu, "Exfoliation of layered double hydroxides for enhanced oxygen evolution catalysis," Nature Communications 5, 4477, 9 pages (2014).

Song & Hu, "Ultrathin Cobalt-Manganese Layered Double Hydroxide is an Efficient Oxygen Evolution Catalyst," Journal of the American Chemical Society 136(47), pp. 16481-16484 (2014).

Stevanovic, et al., "Assessing capability of semiconductors to split water using ionization potentials and electron affinities only," Physical Chemistry Chemical Physics 16, pp. 3706-3714 (2014).

Vialat, et al., "High-Performing Monometallic Cobalt Layered Double Hydroxide Supercapacitor with Defined Local Structure," Advanced Functional Materials 24(30), pp. 4831-4842 (2014).

Wang, et al., "Three-dimensional porous architectures of carbon nanotubes and graphene sheets for energy applications," Frontiers in Energy Research 2, 33, 8 pages (2014).

Young, et al., "Band Diagram and Rate Analysis of Thin Film Spinel LiMn2O4 Formed by Electrochemical Conversion of ALD-Grown MnO," Advanced Functional Materials 26(43), pp. 7895-7907 (2016).

Young, et al., "Charge Storage in Cation Incorporated a-MnO2," Chemistry of Materials 27(4), pp. 1172-1180 (2015).

Young, et al., "In situ electrochemical high-energy X-ray diffraction using a capillary working electrode cell geometry," Journal of Synchrotron Radiation 24(4), pp. 787-795 (2017).

Zhao, et al., "Layered Double Hydroxide Nanostructured Photocatalysts for Renewable Energy Production," Advanced Energy Materials 6(6), 1501974, 20 pages (2015).

Bird & Kuhn, "Electrochemistry of the viologens," Chemical Society Reviews 10, pp. 49-82 (1981).

Deakin & Buttry, "Electrochemical applications of the quartz crystal microbalance," Analytical Chemistry 61(20), pp. 1147A-1154A (1989).

Fall, et al., "Deriving accurate work functions from thin-slab calculations," Journal of Physics: Condensed Matter 11(13), 2689 (1999).

Gong, et al., "Ultrafast high-capacity NiZn battery with NiAlCo-layered double hydroxide," Energy & Environmental Science 7, pp. 2025-2032 (2014).

Guo, et al., "Layered double hydroxide films: synthesis, properties and applications," Chemical Communications 46, pp. 5197-52110 (2010).

Katan, et al., "Silver/Silver Chloride Electrodes: Surface Morphology on Charging and Discharging," Journal of the Electrochemical Society 121(6), pp. 757-764 (1974).

Maeda, et al., "Modification of Wide-Band-Gap Oxide Semiconductors with Cobalt Hydroxide Nanoclusters for Visible-Light Water Oxidation," Angewandte Chemie International Edition 55(29), pp. 8309-8313 (2016).

Mousavi, et al., "Ionic Liquids as Electrolytes for Electrochemical Double-Layer Capacitors: Structures that Optimize Specific Energy," ACS Applied Materials & Interfaces 8(5), pp. 3396-3406 (2016).

Pacchioni, "Modeling doped and defective oxides in catalysis with density functional theory methods: Room for improvements," The Journal of Chemical Physics 128, 182505 (2008).

Rommerskirchen, et al., "Single module flow-electrode capacitive deionization for continuous water desalination," Electrochemistry Communications 60, pp. 34-37 (2015).

Saha, et al., "Rechargeable magnesium battery: Current status and key challenges for the future," Progress in Materials Science 66, pp. 1-86 (2014).

Sherman, "Electronic structures of iron(III) and manganese(IV) (hydr)oxide minerals: Thermodynamics of photochemical reductive dissolution in aquatic environments," Geochimica et Cosmochimica Acta 69(13), pp. 3249-3255 (2005).

Slater, et al, "Sodium-ion batteries," Advanced Functional Materials 23(8), pp. 947-958 (2013).

Zhao, et al., "Energy consumption in membrane capacitive deionization for different water recoveries and flow rates, and comparison with reverse osmosis," Desalination 330, pp. 35-41 (2013).

Chen, et al., "Nickel-Cobalt Layered Double Hydroxide Nanosheets for High-performance Supercapacitor Electrode Materials," Advanced Functional Materials 24(7), pp. 934-942 (2014).

(56) References Cited

OTHER PUBLICATIONS

Choy, et al., "Inorganic Layered Double Hydroxides as Nonviral Vectors," Angewandte Chemie International Edition 39(22), pp. 4041-4045 (2000).
Keen & McGreevy, "Structural modelling of glasses using reverse Monte Carlo simulation" Nature 344, pp. 423-425 (1990).
Schott, "Relationship between zero point of charge and solubility product for hydroxides of polyvalent cations," Journal of Pharmaceutical Sciences 66(11), pp. 1548-1550 (1977).
Xu, et al., "Dispersion and Size Control of Layered Double Hydroxide Nanoparticles in Aqueous Solutions," The Journal of Physical Chemistry B 110(34), pp. 16923-16929 (2006).
Zhang, et al., "Crystal-Face-Selective Supporting of Gold Nanoparticles on Layered Double Hydroxide as Efficient Catalyst for Epoxidation of Styrene," ACS Catalysis 1(4), pp. 232-237 (2011).

* cited by examiner

LAYERED HYDROXIDES AS ANION INSERTION MATERIALS

STATEMENT OF GOVERNMENT SUPPORT

This invention was made with government support under Contract No. DE-AC02-06CH11357 awarded by the United States Department of Energy to UChicago Argonne, LLC, operator of Argonne National Laboratory. The government has certain rights in the invention.

CROSS-REFERENCE TO RELATED APPLICATIONS

This application claims priority to and the benefit of U.S. Provisional Patent Application No. 62/683,207, filed on Jun. 11, 2018, the content of which is incorporated by reference herein in its entirety.

TECHNICAL FIELD

The present disclosure relates generally to methods for anion insertion materials.

BACKGROUND

Electrode materials have a wide range of applications ranging from water desalination to energy storage. Recent advances have improved upon conventional carbon electrodes commonly used in these devices by pairing a cation insertion electrode with an anion insertion electrode to enhance capacity and efficiency. High rate cation insertion materials derived from battery technology which are stable in water are well suited for this application. However, technology is lacking with regard to an analogous electrode material for anion insertion. The lack of a suitable anion insertion material to match the high performance cation insertion materials results in charge balance constraints during deionization, which bottlenecks the performance of the device. The present invention relates to layered hydroxides as anion insertion materials.

SUMMARY

Embodiments described herein relate generally to an ion insertion device comprising: a cation electrode; an anion electrode comprising a layered hydroxide, wherein the layered hydroxide has the formula $(M^1)_x(M^2)_y(M^3)_z \ldots (OH)_6A$, where M is the cation and A is the anion, with $M^1$, $M^2$, $M^3$ . . . each being different cation and further wherein x, y, and z are whole numbers and x is equal to one or more. In some embodiments of the device the anion electrode is a poly-layered hydroxide wherein y is equal to one or more and z is equal to one or more. In some embodiments of the device, the anion electrode is a mono-layered hydroxide wherein y and z are zero. In some embodiments of the device, the anion electrode is a flow electrode and further wherein the anion electrode is contained within a housing.

Some embodiments relate to a process for synthesizing layered hydroxides comprising: forming a mixture of a first cation salt and a second cation salt in water; injecting the mixture into a NaOH solution; and extracting layered hydroxide nanoparticles. In some embodiments of the process, a conductive support is deposited in the NaOH prior to injection of the mixture. In some embodiments of the process, the nanoparticles are extracted embedded in the conductive support.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 3 shows reduction of layered hydroxides.

FIG. 6 shows EXAFS of Co-V LH under oxidizing potentials.

FIG. 7 shows PDF and RMC on Mg—Al LDH.

FIG. 12 shows structural details for work function calculations.

Figure 1A:
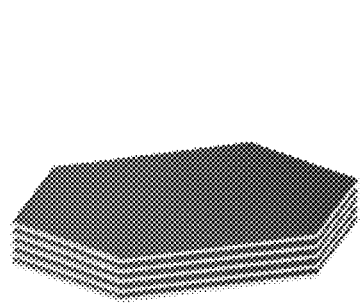
FIG. 1A shows a cartoon schematic of isolated LH nanoparticle based on the annular dark field (ADF) STEM micrograph of Mg—Al LDH showing nanoplatelet morphology with EDS mapping of Mg, Al, and O (shown in FIG. 1B) and the high resolution ADF-STEM image of Co—Al LDH showing ~5 nm nanoplatelet thickness with visible LH planes (shown in FIG. 1C).

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Electrode materials which undergo anion insertion are a void in the materials innovation landscape and a missing link to energy efficient electrochemical desalination. Layered hydroxides (LHs) have been widely used in electrochemical applications. Prior work described in U.S. Provisional Application No. 62/418,534 posited that LHs could be used as an electrode material for anion insertion electrochemistry. Further described herein are extensions to the basic concept of LHs as electrode materials, include both new materials for use with LHs, such as layered mono-hydroxides (LMH) and higher order layered poly-hydroxides (LPHs), including layered double hydroxides (LDH) as well as methods for synthesizing improved LH material such as with conductive supports or through the use of cross-linking. Poly-layer hydroxides generally consists of the formula $(M^1)_x(M^2)_y(M^3)_z \ldots (OH)_6A$, where M is the cation and A is the anion, with $M^1, M^2, M^3 \ldots$ each being different cations. LMH have only $M^1$ while DLH have $M^1$ and $M^2$. Finally, also described herein are embodiments enabling the use of LHs as flow electrodes as well as the use of thin (2d) LH materials (TLH) for surface redox reactions.

Layered Double Hydroxides

The LH material provides a structure capable of allowing an ion to move in and out of the physical structure. In some of the illustrated embodiments, a bias is applied to move the ion relative to the structure.

LHs allow for facile synthesis and a modularity of possible compositions, enabling tunable (electro)chemical properties. LHs consist of alternating layers of (a) positively charged planes of metal centers (cations) which are octahedrally coordinated to hydroxyl groups and (b) interplanar anions and water. The cation material in the LH may be any suitable cation material, including alkaline, alkaline earth, transition metals and nonmetals. While it is believed that a blend of cations which have 2⁺ and 3⁺ valence provide improved functionality, LH can be stable with alkaline (1⁺), alkaline earth, transition metals, nonmetals, and lanthanides. In one embodiment, the anion insertion material comprises a cation material capable of forming a 1⁺, 2⁺, or 3⁺ state. In a particular embodiment the 1⁺/2⁺ material includes Ca, Cd, Co, Cu, Li, Mg, Mn, Ni, Zn. In a particular embodiment, the 3⁺ material includes Al, Cr, Fe, V, and Co. The ratio of 2⁺/3⁺ can vary from 1:0 up to 1:2 or larger. The layered structure is expected to be more stable when the ratio is 1:1 or greater. When considering redox active 2⁺ or 3⁺ metal centers, the redox active component should ideally be high enough to provide a large capacity, but low enough to provide structural stability. Redox active metals include Mn, Ni, Co, Fe, V, Mo, and other transition metals. Structural metals include Mg, Al, Si, Ge, Ca, Li, and other alikali metals, alkaline earth metals, post-transition metals, and metalloids. Here a redox active metal is meant as a transition metal which has an equilibrium potential where the oxidation state of the transition metal nominally changes state (but remains as a cation) within the potential limits of water splitting, e.g. Fe3+/Fe2+ at 0.77 V vs NHE, along with a subset of examples in the electrochemical series. Redox active metal centers should be 20-80% of the structural cations for multiplayer LH particles, and 50-100 atomic weight % of cations for single layer or 2d LHs to balance these requirements. Note that the redox active metal center can be either $2^+$ or $3^+$.

The metal hydroxide planes in LHs can be comprised of a single metal center (e.g., cobalt hydroxide with root formula $Co(OH)_2$), two metal centers, termed LDHs (e.g., naturally occurring hydrotalcyte with root formula $Mg_3Al(OH)_8$), or more than two metal centers (LPH). Metal centers in the metal hydroxide planes may be homogeneous. In another embodiment, the metal centers are heterogenous, for example a blend of divalent (e.g., Mg, Co) and trivalent (e.g., Al, Cr, V, Co) cations. Interplanar anions in the LH structure balance charge with tri-valent metal cations in the metal hydroxide planes and cohere the planes together into nanoplatelet stacks.

In order to investigate LHs, experiments were performed with advanced in situ characterization during electrochemical operation and ab initio material modeling to probe the anion insertion electrochemistry of LH nanoplatelets. The unified electrochemical band-diagram (UEB) framework enables modeling of the thermodynamics of anion insertion (and other structural changes) under applied bias despite the lack of a convenient computational anion reference. As descried below, coupling computational results within the UEB framework with in situ experimental measurements including quartz crystal microbalance (QCM), high energy X-ray diffraction (HE-XRD), and X-ray absorption spectroscopy (XAS) provides compelling evidence of anion insertion electrochemistry in LHs.

Example I—LDH Nanoparticle Synthesis and Characterization

Layered hydroxide nanoparticles were synthesized using co-precipitation. Salt solutions for nanoparticle synthesis were prepared using chloride salts for Co: cobalt(II) chloride (anhydrous, 99.7%, Alfa Aesar), Cr: chromium(III) chloride hexahydrate (98%, Alfa Aesar), V: vanadium(III) chloride (anhydrous, 99%, Alfa Aesar), Al: aluminum chloride hexahydrate (99%, Alfa Aesar), and Mg: magnesium chloride hexahydrate (ACS Grade, Ampresco). For LDHs, 1.5 mmol of $M^{3+}$ salt was combined with 0.5 mmol of $M^{2+}$ salt in 5 mL of deionized (DI) water (18.2 MΩ, Millipore Direct-Q) to make a salt solution. For Co LH, 2 mmol of salt was dissolved in 5 mL of DI water to make a salt solution.

20 mL of 0.15M NaOH (ACS Grade, EMD Millipore) was purged for >15 minutes under argon (Ar, UHP, General Air Service and Supply) atmosphere in a 3-neck flask at room temperature (~20° C.). 5 mL of salt solution (see above) was rapidly injected into the NaOH solution, and held under Ar atmosphere for >15 minutes to seed nanoparticle formation. The nanoparticles were rinsed three times by: (1) centrifuging the ~25 mL nanoparticle suspension for 3 minutes at 7000 rpms, (2) pouring off the supernatant, and (3) resuspending the nanoparticles in DI water to return the total volume of the suspension to ~25 mL. The resulting aqueous suspensions contained ~3 μg/μL of nanoparticles. Following this synthesis procedure, the nanoparticles were either aged using hydrothermal treatment at 100° C. for 4 hours, or at room temperature for at least one week.

Cobalt-containing LHs for anion insertion. The seminal work identifying the LDH structure and synthesis and demonstrating particle size control were based on Mg—Al compositions. While Mg—Al LDH synthesis is robust and well-studied, it is not expected that Mg—Al LDHs to be useful as anion insertion electrodes because Mg and Al do not undergo redox electrochemistry within the potential limits of water stability. Incorporating metal centers into the LH structure which are redox-active within the potential limits for water stability provides a strategy for enabling aqueous anion-insertion electrochemistry. Here, Co-containing LHs are focused on because successful Co-LDH syntheses are known, and Co-containing compounds (e.g., $LiCoO_2$) have been shown to undergo redox reactions within the potential stability limits of aqueous electrolytes.

Figure 1B:
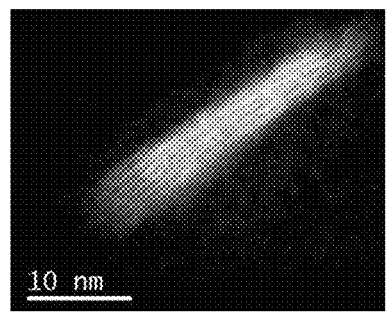
FIG. 1 shows tuning conduction band edge of layered hydroxides.
FIG. 1D shows a pair distribution function analysis of various LH compositions with RMC fitting showing equivalent structure among various LH compositions.
FIG. 1E shows a visualization of layered hydroxide with 2:1 $M^{2+}:M^{3+}$ ratio, containing metal hydroxide planes and interplanar anions.
FIG. 1F shows a band edge locations of various LH structures from ab initio modeling within an electrochemical reference frame, compared with experimental band gap values from UV-V, as well as the projected density of states (PDOS) of Co-V (shown in FIG. 1G) and Co LH from ab initio modeling (shown in FIG. 1H).
Figure 1C:
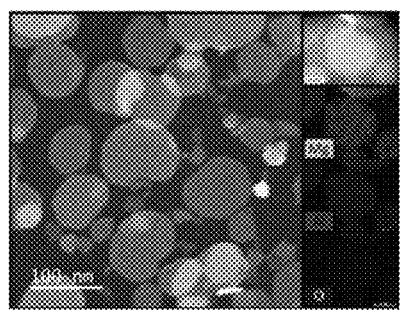

Using coprecipitation of metal chloride salts in strong basic solution, aqueous suspensions of LH nanoparticles are synthesized. LHs spontaneously form a nanoplatelet morphology as depicted in FIGS. 1A-C. Upon dropcasting, these nanoparticles coalesce into nearly uniform coatings on electrode surfaces. A nanoplatelet morphology was observed for all of the LDH compositions examined in this work. In most cases, nanoplatelets were ~100 nm in diameter and 2-5 nm thick, as demonstrated in STEM images for Co—Al and Mg—Al compositions in FIGS. 1B and 1C, respectively.

Various examination techniques were used for qualitative and quantitative analysis of the resultant materials.

For Inductively Coupled Plasma—Optical Emission Spectroscopy (ICP-OES), LH aqueous suspensions were gravimetrically diluted to 1% concentrations in DI water. Then 5 g of 1% dilutions are gravimetrically combined with 5 g of 10% nitric acid. These solutions and DI-water and nitric acid control solutions were submitted to the Laboratory for Environmental and Geological Studies (LEGS) at the University of Colorado Boulder for ICP-OES measurement and analysis.

Ultra-violet Visible Spectroscopy (UV-Vis) (Cary 8454, Agilent Technologies) was performed between 230 nm and 900 nm in polystyrene disposable cuvettes (1 cm path length, PLASTIBRAND). 100 μL of nanoparticle suspension was diluted in 2 mL of DI water, and a DI water blank was measured before each sample. Tauc plot analysis was performed for direct allowed transitions ($r=\frac{1}{2}$).

High resolution ADF Scanning Transmission Electron Microscopy (STEM-EDS) imaging was performed on a JEOL ARM200F with a Schottky field emission source operating at 200 kV. Samples were prepared by diluting LH suspensions to 1% in DI water and drop casting 5 μL of sample onto ultrathin carbon coated lacey carbon grids (Ted Pella, USA) and plasma cleaning in a 97% hydrogen, 3% oxygen plasma (Fischione model 1070 plasma cleaner) for 1 minute directly prior to imaging. ADF STEM images were acquired under relatively low dose conditions to avoid damage of the LHD particles. The beam current was ~20 pA and the pixel dwell time was 25 μs. The ADF detector inner collection angle was ~70 mrad.

STEM-EDS elemental mapping was performed on an FEI Talos F200X TEM operating at 200 kV with a Schottky field emission source and Bruker ChemiSTEM EDS system. Pixel intensities in the EDS maps for Mg, Al, and O were computed by integrating the $L\alpha_1$ peaks for each element. STEM imaging on Co LH were performed in a similar manner using a Talos™ operating at 200 kV.

HE-XRD was performed both in situ and ex situ at the 6-ID-D beamline at the Advanced Photon Source (APS) at Argonne National Lab using 100 keV irradiaton. Supplemental ex situ HE-XRD measurements of Mg2Al and Co LHs were performed at 11-ID-B and 11-ID-D beamlines using 58.65 and 105 keV irradiaton, respectively. All measurements were performed in a transmission configuration with the sample-to-detector distance set to maximize the sampled q-range.

For HE-XRD characterization, LH nanoparticle suspensions were frozen overnight at −80° C., then lyophilized (VirTis, Benchtop K) to produce bulk nanoparticle powders. For ex situ measurements, these powders were crushed and ground into fine particles, then loaded into Kapton capillaries (1 mm dia., Cole-Palmer) and measured in an automated fashion with a multi-sample stage. In situ measurements during electrochemical operation were performed using a capillary working electrode cell geometry as described elsewhere. Conductive granular activated carbon (Norit GAC 400 M-1746) is used as an electrode support inside of the carbon fiber capillary working electrode, and lyophilized LH powder is added on top of the GAC. The X-ray beam position was adjusted to the GAC/active material interface to probe active LH material in electrical contact with the conductive carbon support.

Figure 7A:
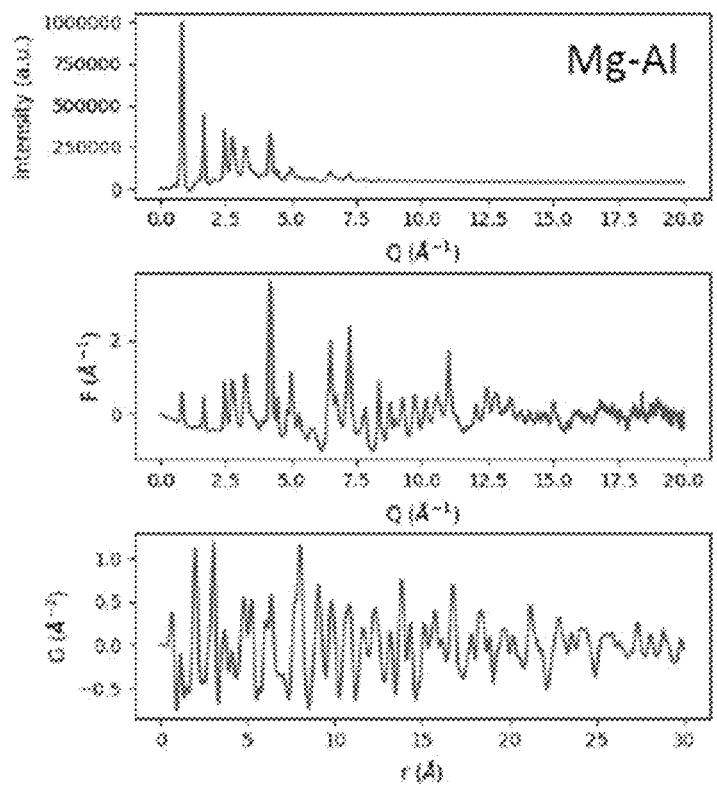
FIG. 7A shows pair distribution function calculation including raw iffracted X-ray intensity, i(Q), reduced total scattering factor, F(Q), and pair distribution function, G(r), for the Mg—Al LDH.
Figure 7B:
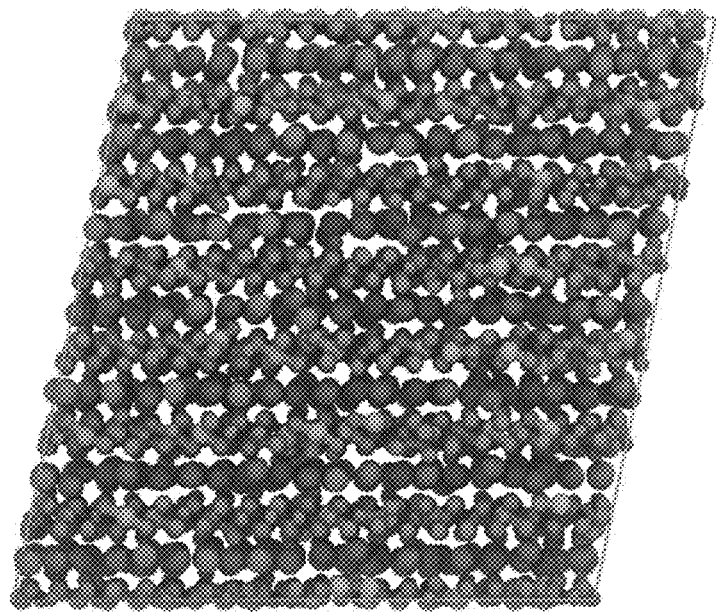
FIG. 7B shows final RMC periodic cell structure for the Mg—Al LDH fit to the PDF data in FIG. 7A.
Figure 8A:
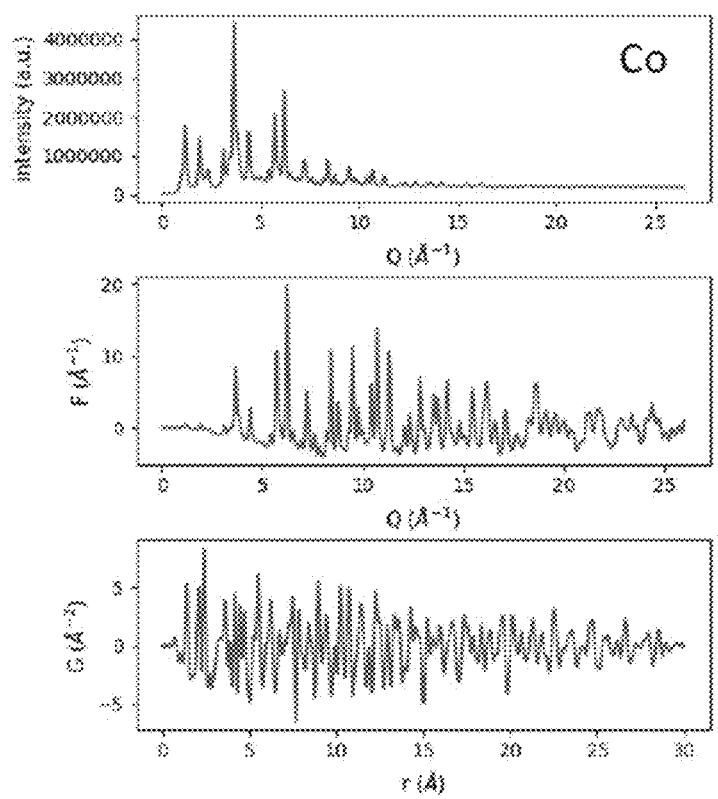
FIG. 8 shows PDF analysis on Co LHs. Raw diffracted X-ray intensity, i(Q), reduced total scattering factor, F(Q), and pair distribution function, G(r) for Co (FIG. 8A), Co-V (FIG. 8B), Co—Al (FIG. 8C), and Co—Cr LHs (FIG. 8D).
Figure 8B:
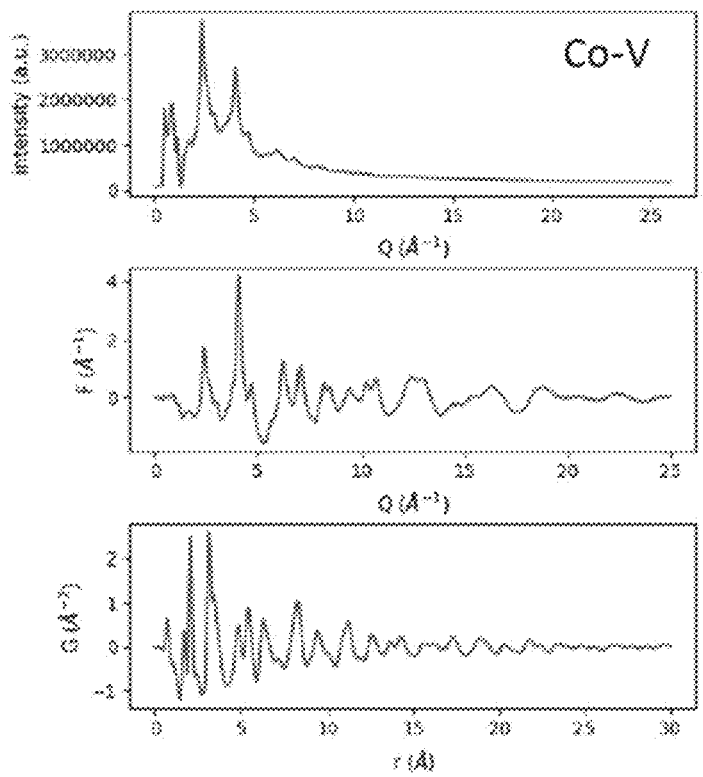
Figure 8C:
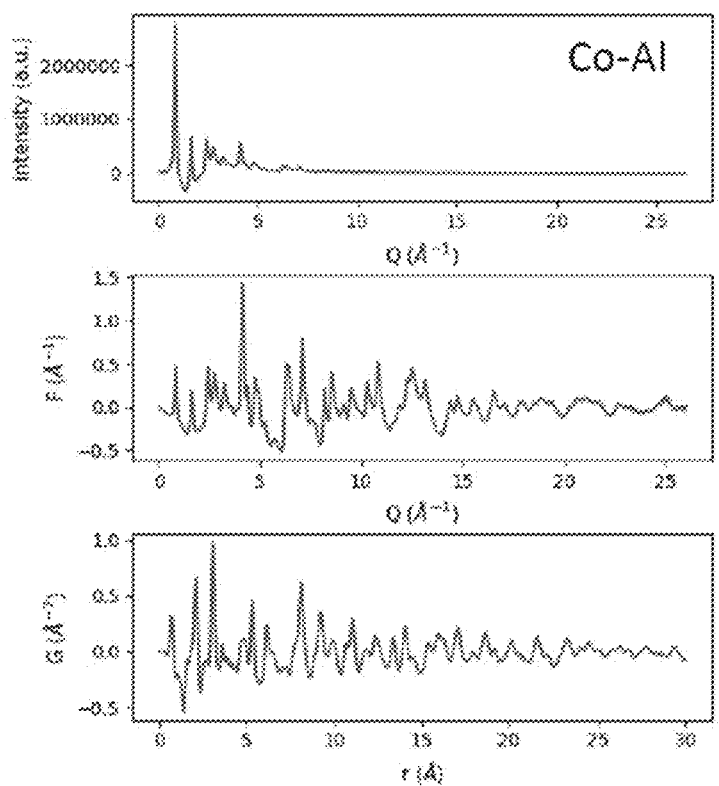
Figure 8D:
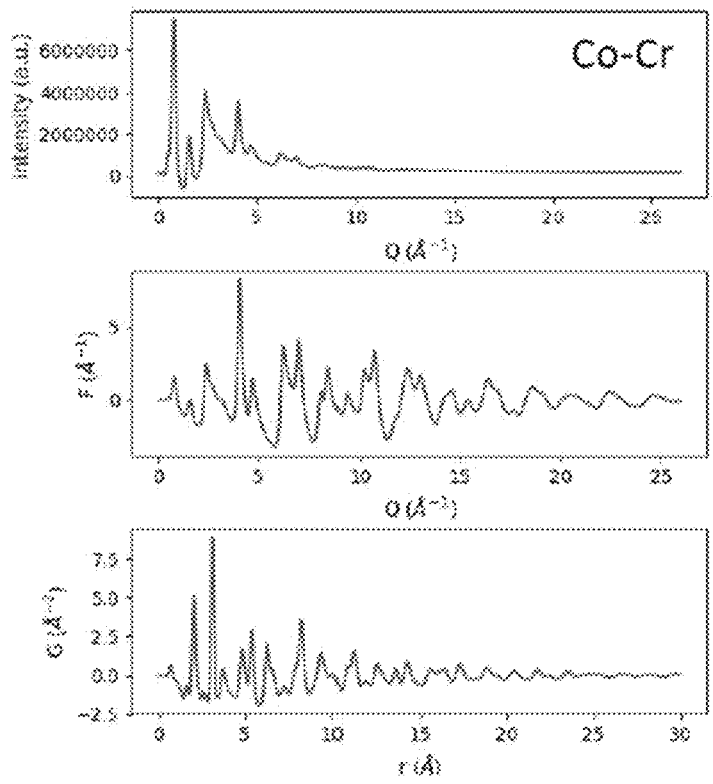

Background correction, conversion to total structure functions, and Fourier transformation to produce atomic pair distribution functions (PDFs) was performed using PDFgetX3. Diffracted X-ray intensity, $i(Q)$, reduced total scattering factor, $F(Q)$, and pair distribution function, $G(r)$, for the Mg—Al LDH are plotted in FIG. 7A. Using starting structures from ab initio modeling (see below), a first-pass structural fit was performed on a unit cell structure using PDFgui with optimization of lattice vectors only. The output structures from PDFgui were expanded into supercells with 40 Å minimum dimensions, and used as starting structures for reverse monte carlo (RMC) modeling. RMC modeling was performed for ex situ samples using the fullrmc python package. The fitted RMC structure for the Mg—Al LDH is shown in FIG. 7B. Additional plots of $i(Q)$, $F(Q)$, and $G(r)$ for the Co, Co-V, Co—Al, and Co—Cr LHs are presented in FIGS. 8A-D, respectively.

XAS and subsequent extended X-ray absorption fine structure analysis (EXAFS) was performed using in situ XAS measurements during electrochemical characterization at the 10-BM beamline at the APS at Argonne National Lab. 400 μL of LH suspension were dropcast onto nonwoven carbon fiber paper (Fuel Cell Earth, Toray Carbon Paper, ~300 μm thickness) in 50 μL aliquots, resulting in a mass loading of ~1 μg. This carbon paper was loaded into a custom polyether ether ketone (PEEK) electrochemical cell with Kapton windows and titanium wire current collector as depicted in other work. A BioLogic SP-300 potentiostat was used for electrochemical control.

EXAFS measurements were performed on the Co K-edge (7.71 keV) in a fluorescence geometry using a 4-element Vortex Silicon Drift Diode. For each measurement a constant voltage was applied to the cell and EXAFS scan were taken from −200 eV to +800 eV relative to the Co K-edge. See FIG. 9 for Co K-edge X-ray absorption near-edge spectra (XANES) of the Co-V LDH under various applied biases. Subsequent data processing and EXAFS modeling as performed using the Athena and Artemis programs of the Demeter XAS software package. 2EXAFS modeling was first performed on reference Co foil to obtain an $S_0^2$ value of 0.755 for all subsequent modeling efforts. EXAFS modeling on Co-V LDH at various potentials was performed using theoretical scattering paths from DFT generated structures (see FIGS. 10 and 11 for the amplitude and real space fitting results, respectively). Given the difficulty in distinguishing Co from V theoretical scattering paths, models were performed by treating all metal scatters as a singular elemental species. EXAFS modeling produced similar Co—O coordination number (~6) and Co—O Debye-Waller factors (~0.008) for each voltage condition, which were then considered as defined constants for subsequent modeling efforts to obtain Co-metal structure and Co—O nearest neighbor distances. All fittings resulted in R-factors of less than 0.02, indicating a high quality fit.

Ab initio modeling was performed. LH electrochemical thermodynamics were modeled using the UEB framework, as described in prior work. Various point defects were modeled in LH structures including substitutions, vacancies, and interstitials, with primary focus on the electrochemically active $Co_3(OH)_6Cl$ and $Co_2V(OH)_6Cl$ structures and Cl insertion/removal. Total energy calculations are performed for perfect and (charged) defect structures using density functional theory (DFT) and the projector augmented-wave (PAW) method as implemented in the Vienna Ab initio Simulation Package (VASP). Chemically relevant cobalt 3d and 4s; vanadium 3p, 3d, and 4s; chlorine 3s and 3p; oxygen 2s and 2p; and hydrogen 1s electrons are calculated explicitly using PAWs, while pseudopotentials describe core electrons. A fully automatic Γ-centered Monkhorst-Pack K-point mesh was generated for all structures using VASP with I=14.

A modified Heyd-Scuseria-Ernzerhof (HSEsol) range-separated functional was applied for charged defect calculations to correct for self-interaction error in defect calculations. Multi-step ionic and cell-shape relaxations were carried out as implemented in the pylada python module. The pH and applied bias were accounted for in formation energies calculations by using the hydroxide-forming limit and setting the chemical potential of H based on the pH as described previously. Bulk crystal hydroxide structures are used instead of individual hydroxide molecules for reference calculations (note a sign correction in the applied bias as compared with this prior work). All calculations are performed using a surface description by accounting for band bending at the electrode surface. For this, it is assumed that the Nernstian relationship $V=V_{PZC}+0.059(pH_{PZC}-pH)$, as described previously, and use a pHPZC value of 11.4 based on the PZC reported for $Co(OH)_2$.

Figure 1D:
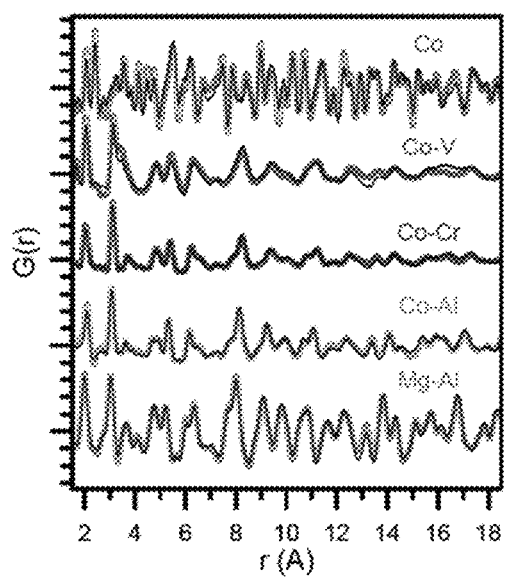
Figure 1E:
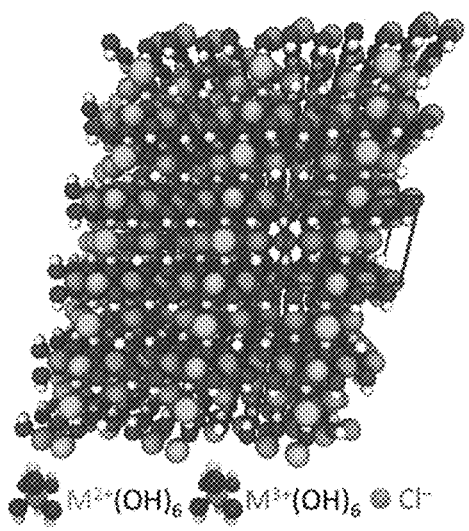
Figure 12A:
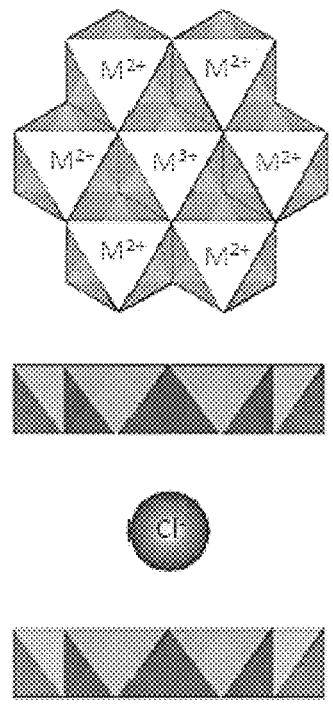
FIG. 12A shows honeycomb orientation of metal centers in hydroxide planes based on $Mg_2Al(OH)_6Cl$ structure and FIG. 12B shows plane-averaged local Hartree potential in bulk ($E_H^{bulk}$) vs. calculated fermi energy (Sf).
Figure 12B:
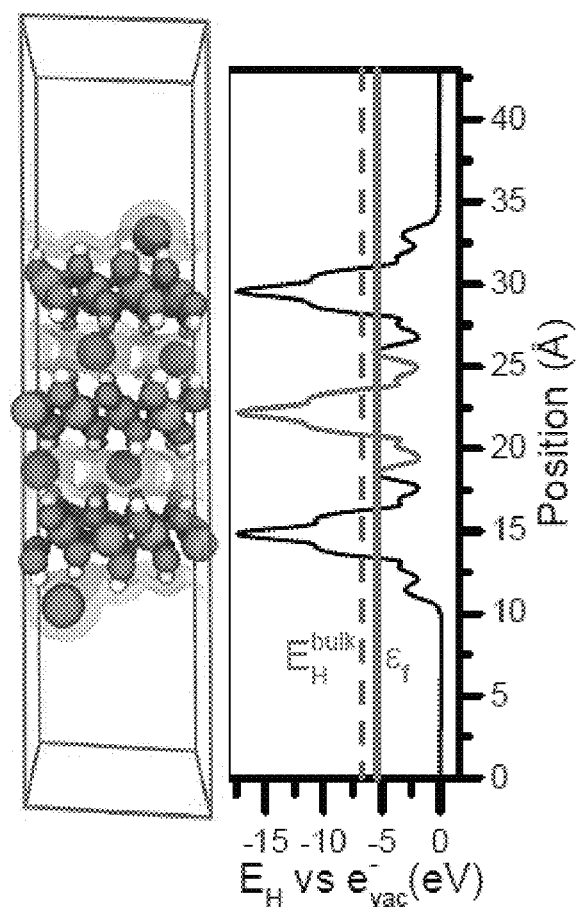

The idealized 2:1 $M^{2+}$-$M^{3+}$ molar ratio LDH structure depicted in FIG. 1E with a honeycomb metal configuration based on the 2:1 Mg—Al LDH structure as depicted in FIG. 12A. The band edges of the material are aligned within an electrochemical reference frame using work function calculations for the dominant {100} surface which is perpendicular to the LH planes as depicted in FIG. 12B. This employed ≥17 Å thick slabs, and ≥15 Å vacuum space, with ionic relaxation on all atoms >5 Å from the center plane of the slabs. The potential difference between vacuum and the bulk material is calculated using the Purdew-Burke-Ernzerhof (PBEsol) functional and correct the band edge positions at the HSEsol level in a similar fashion to work correcting band edge energies using quasiparticle calculations.

Electrochemical characterization for ex situ and in situ HE-XRD and XAS studies was performed with a potentiostat (Biologic, SP-300) using a Ag/AgCl reference electrode (BASi) and graphite counter electrode (7 mm dia. Graphite electrode, BioLogic). Electrolyte solutions for all electrochemical studies were purged with Ar for >15 minutes prior to and throughout electrochemical operation.

For ex situ electrochemical characterization, 7 μL aliquots of LH nanoparticle suspensions were dropcast onto glassy carbon electrodes (GCEs, ALS Co. 3 mm dia.) and dried under vacuum for >15 minutes prior to electrochemical measurement. Galvanostatic (constant current) measurements were performed in 0.1 M NaCl (Alfa Aesar, ACS Grade 99.0% min) aqueous electrolyte tuned to a pH of 10 using NaOH.

During in situ HE-XRD, a 0.1 M NaBr (ACS Grade, Alfa Aesar) electrolyte was used to enhance the diffraction signal arising from interplanar anions (Br vs. Cl). A continuous electrolyte flow of 0.4 mL/min was maintained during in situ HE-XRD electrochemical operation using a peristaltic pump (Ismatec IPC). Fresh electrolyte was used for each experiment, and electrolyte was recirculated during electrochemical characterization. NaBr was also used for XAS studies to be consistent with HE-XRD studies.

For Electrochemical Quartz Crystal Microbalance (EQCM) studies, LH nanoparticle suspensions were diluted into equal parts DI water and 20 μL volume aliquots were dropcast onto titanium coated QCM crystals (FilTech, 4.95 MHz, 14 mm), and dried for >20 minutes under vacuum. LH-coated QCM crystals were loaded into a Q-sense electrochemistry module (Biolin Scientific) using a platinum plate counter electrode and Ag/AgCl reference electrode (Dri-Ref 2SH, World Precision Instruments). 0.1M NaCl was tuned to a pH of 10 using NaOH and used as the electrolyte solution. The electrolyte was purged for >15 minutes using Ar prior to use, and kept under continual purge during experimentation. The pH of the source electrolyte was monitored during operation and remained between 10 and 10.5. Electrolyte was used to purge the cell and tubing for >5 minutes at a flow rate of 0.4 mL/min using a peristaltic pump (Ismatec IPC). Electrolyte flow was stopped during electrochemical characterization to eliminate flow eddies and vibrations present during flow and improve QCM resolution.

Figure 13:
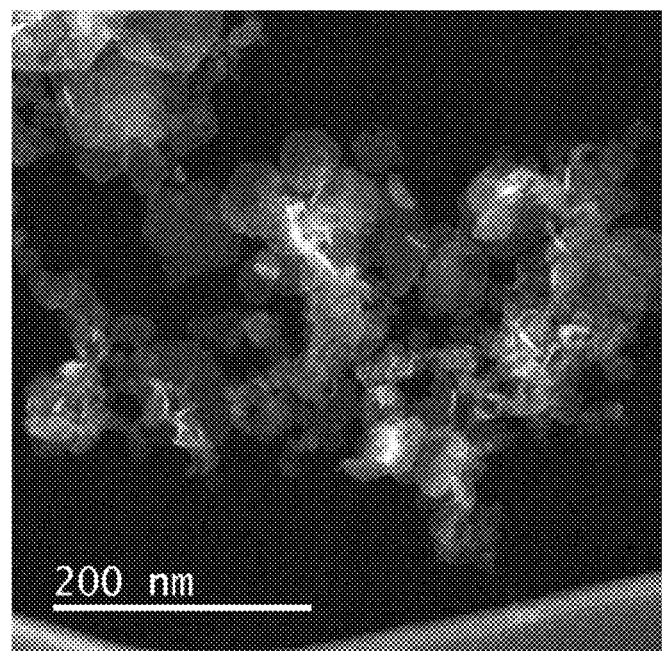
FIG. 13 shows STEM of Co-V LDH. Micrograph of Co-V LDH nanoplatelets shows analogous morphology and particle size to Mg—Al and Co—Al nanoplatelets.
Figure 14:
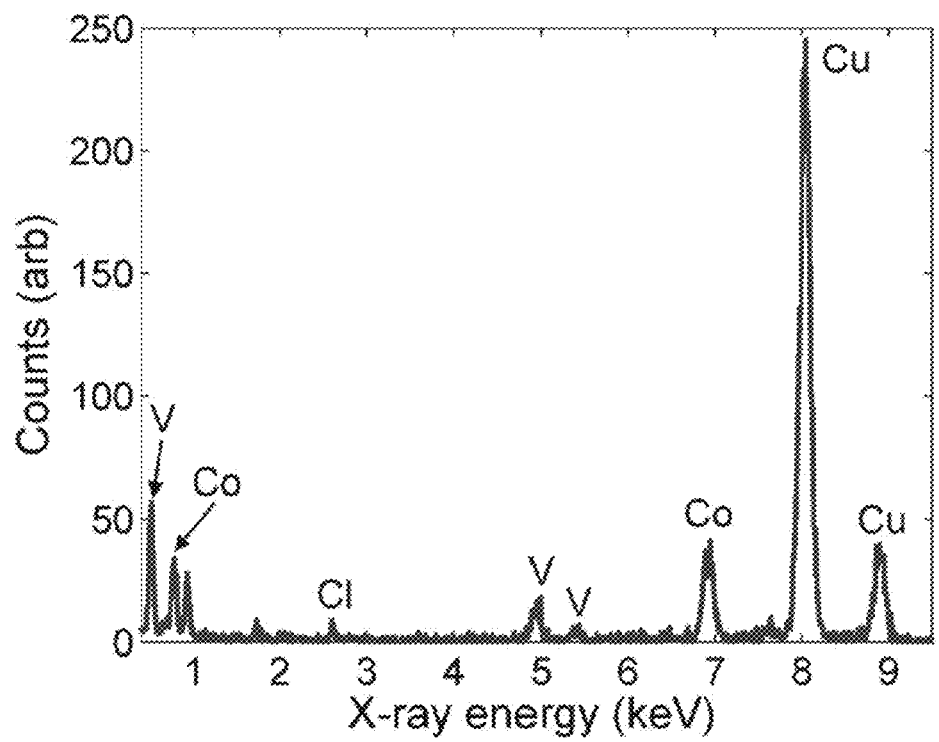
FIG. 14 shows EDS spectrum of Co-V LDH nanoplatelets. EDS indicates presence of Co and V in a 3:1 ratio in the Co-V LDH sample. Also observe interplanar Cl, and Cu from TEM grid.

Presented in FIG. 13 is a ADF STEM image of the Co-V LH. The nanoplatelet morphology and size observed is consistent with the LH structure and agrees closely with the STEM results for Mg—Al and Co—Al LHs presented in FIG. 12. An exemplary energy dispersive x-ray spectroscopy (EDS) measurement of a Co-V nanoplatelet is presented in FIG. 14. This EDS spectrum clearly shows the presence of both Co and V in these nanoplatelets. The signal for Cu arises from the TEM grid. EDS quantitative analysis identified an average Co:V ratio of 3.3±0.4 by sampling seven particles. One measurement indicated a Co:V ratio of 5.8, but was a statistical outlier and was excluded from the calculation of this average value.

Interestingly, the Co:V ratio of ~3 determined by STEM-EDS is much smaller than the value of 48 determined by ICP-OES following digestion. It is believed that this discrepancy is due to a bias in the STEM-EDS analysis toward larger, structurally defined nanoplatelets. During STEM of the Co-V agglomerates of smaller nanoplatelets which were not stable under the electron beam and could not be characterized by EDS were not observed. Further, it is believed that these smaller nanoplatelets were $Co(OH)_2$, leading to a lower average concentration of V when the entire sample is digested.

Figure 15:
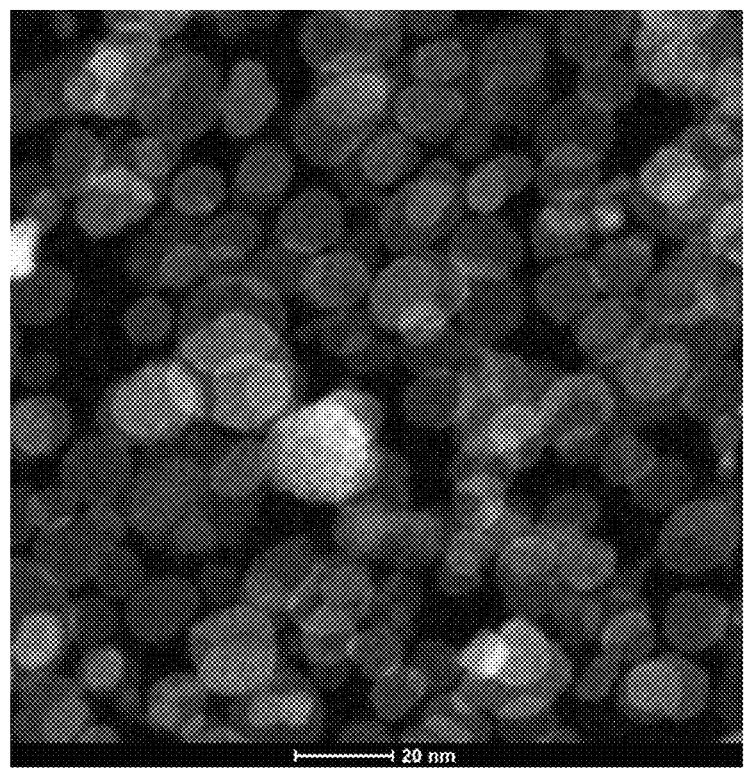
FIG. 15 shows STEM of Co LH. Micrograph of Co LH shows monodispersed nanoplatelets of ~10 nm diameter. An order of magnitude smaller than the LDH nanoplatelets.

Presented in FIG. 15 is an ADF STEM micrograph of Co LH nanoplatelets synthesized without a trivalent metal center. These nanoplatelets are similar in shape to the LDH structures, but are only ~10 nm in diameter rather than ~100 nm as observed for the LDH compositions. These smaller $Co(OH)_2$ nanoplatelets are consistent with the explanation above describing the presence of $Co(OH)_2$ in the Co-V nanoplatelet sample.

Figure 16:
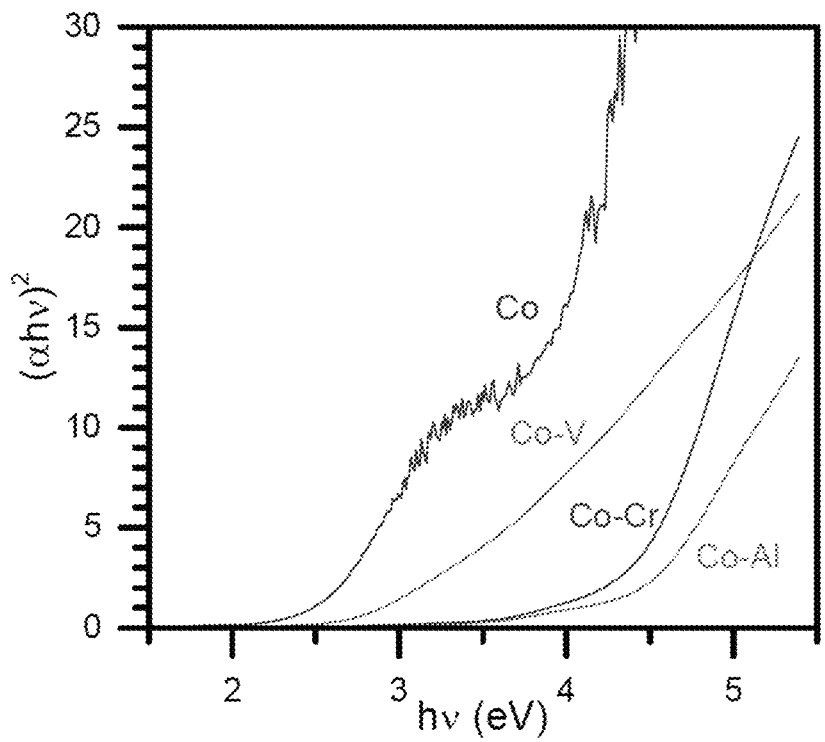
FIG. 16 shows UV-Vis Data for LHs. Tauc plot of LH UV-Vis data using r=½ for direct allowed transitions.

Presented in FIG. 16 is a Tauc plot of UV-Vis data collected on aqueous LH suspensions. Tauc analysis is performed for direct allowed transitions. The band gap of each layered hydroxide is determined by extrapolating the linear portion of the trace to the intersection of $(\alpha h\nu)2=0$. Band gaps are calculated to be 4.4 eV (Co—Al), 4.4 eV (Co—Cr), 2.7 eV (Co-V), and 3.7 eV (Co). No absorption was observed for $Mg_2Al$ for the range of photon energies examined by UV-Vis, suggesting a band gap >5.3 eV. The linear region >4 eV is used for determination of the Co LH band gap, and attribute the lower-energy absorption to defect states. For the Co-V trace two linear regions were observed: one between 2.5 and 3.7 eV, and one between 4 eV and 5.3 eV. The lower-energy linear region of the Co-V trace is used for band gap determination. Using the higher energy region, a bandgap of ~3.5 eV was calculate. Similarly, a minority absorption is also observed at lower energies for Co—Al and Co—Cr corresponding to a band gap of ~3.5 eV. A 3.5 eV band gap agrees closely with the band gap determined for the Co LH ($Co(OH)_2$). It is believed that the secondary absorption observed for each of the binary LDHs arises from local regions of $Co(OH)_2$ present in these compositions.

Synthesis of Mg—Al LHs in this work yielded a bulk $M^{2+}:M^{3+}$ (Mg:Al) molar ratio of 1.7 as measured by inductively coupled plasma optical emission spectroscopy (ICP-OES). This is in agreement with prior work on Mg—Al LDHs indicating stable Mg—Al LDHs with Mg:Al stoichiometric ratios between 1 and 5. STEM-EDS indicates uniform distribution of Mg and Al in LDH particles as depicted in FIG. 3C.

Co—Al and Co—Cr LHs synthesized in this work exhibited $M^{2+}:M^{3+}$ molar ratios of 1.8 and 2.0, respectively, by ICP-OES. These stoichiometric ratios are in agreement with prior work which reports molar ratios of ~2 for these compositions. In addition, we Co-V LDHs were synthesized, which to our knowledge have not been reported previously. ICP-OES measurements indicated a bulk Co:V molar ratio of 48:1, corresponding to Co LH ($Co_x(OH)_{2x}Cl$) with ~2% V-doping. However, STEM-EDS analysis of Co-V LHs identified particles containing a 3:1 ratio of Co:V, suggesting a mixture of $Co_3V(OH)_8Cl$ and Co LH. A low bulk V concentration is expected considering the favorability of V vacancies in the Co-V structure.

Despite the low V concentrations in the Co-V LDH, the atomic structure of the Co-V LDH (FIG. 1B) is in close agreement with the other LDH structures. We also emphasize that the measured UV-vis band gap of the V-doped cobalt hydroxide structure (2.7 eV) is in close agreement with calculated band gap for a 3:1 Co:V stoichiometric ratio (2.75 eV for $Co_3V$ LDH), and do not agree with calculated band gaps for the $Co(OH)_2$ cobalt hydroxide structure (3.6 eV) indicating that 2% V-doping is sufficient to impact the bulk electronic properties. Although the electronegativity of V (1.63) falls between that of Al and Cr (1.61 and 1.66, respectively), the band gap of the Co-V LDH is dramatically lower than the other structures. We attribute this to differences in the $t_{2g}$-$e_g$ filling for V vs. Cr.

Figure 17:
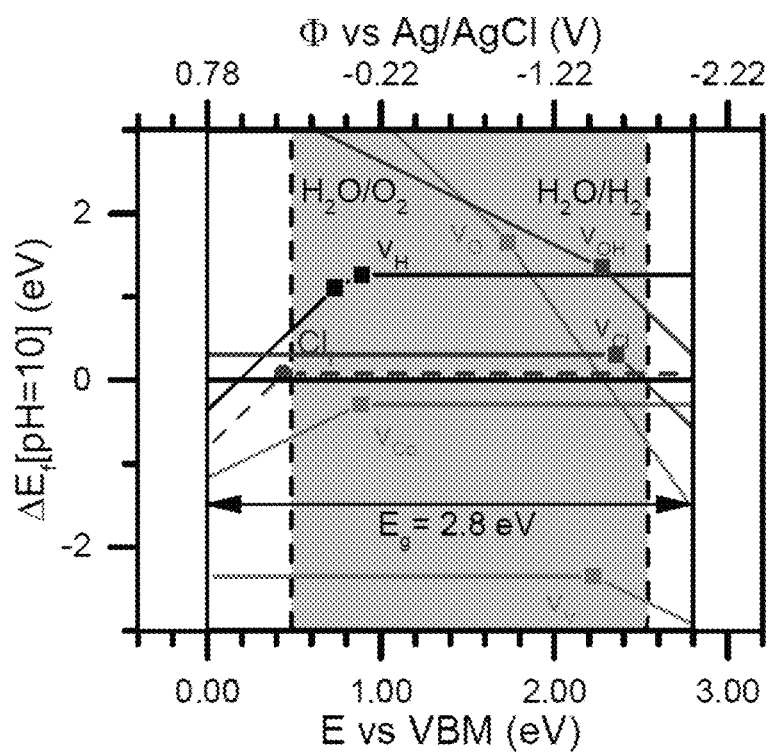
FIG. 17 shows defect formation energy versus applied potential for $Co_3V$ LDH. Calculations on the $Co_3V$ structure suggest that Cl⁻ insertion will not take place until potentials outside the potential limits for water stability. However, the formation of $v_O$, $v_{Co}$, and v are all predicted to be favorable within the applied potential window.

Presented in FIG. 17 are UEB defect plots calculated for the $Co_3V$ LDH structure. These calculations predict that under applied negative bias, Cl— is stable in the $Co_3V$ LDH structure over a wide potential range, and is not predicted to be removed until a negative bias exceeding −1.6 V vs. Ag/AgCl. The formation of $O^{2-}$ vacancies is predicted to occur before the formation of $Cl^-$ vacancies at a lower negative bias of −1.4 V vs. Ag/AgCl In Co$_3$V. Additionally, Cl$^-$ insertion (Cl$_i$) is not predicted to occur until a positive potential exceeding +0.4V vs. Ag/AgCl. Based on these results, Cl$^-$ will not reversibly incorporate in Co$_3$V under applied bias. However, the formation of vanadium vacancies, labeled v$_v$, is predicted to be highly favorable ($\Delta E_f$<−2 eV) over the full range of applied potential, while a reduction of these vacancies is predicted to occur at negative potentials exceeding −1.4V. Similarly, cobalt vacancies (v$_{Co}$) are predicted to be moderately favorable ($\Delta E_f$<−0.2 eV) in Co$_3$V LDH, with oxidation of these vacancies predicted at positive potentials exceeding −0.1 V vs. Ag/AgCl.

FIG. 1B depicts a ~5 nm thick particle, where the metal hydroxide layer separation is measured to be ~8 Å.

We observe an equivalent atomic structure among the Mg—Al, Co—Al, Co—Cr, Co-V, and Co-only LHs studied in this work. Atomic PDF analysis derived from HE-XRD patterns as depicted in FIG. 1D is useful here due to the nanoscale of the LH platelets and the fine structural detail of interest during in situ measurement of anion insertion (see FIG. 4). Atomic PDFs provide sub-Angstrom structural details in terms of real-space atomics distances, and more intuitively showcase the structural features present in the LDH compositions (Mg—Al, Co—Al, Co—Cr, and Co-V). Main atomic pair features at ~2, ~3, and ~8 Å correspond to first-coordination sphere metal-oxygen, metal-metal, and interlayer metal-metal pair distances, respectively, for all materials examined. Reverse Monte Carlo (RMC) fits (thin black lines in FIG. 1D) were performed using starting LH structures determined from ab initio calculations, an example of which is depicted in FIG. 1E. RMC fits are in close agreement with measured PDFs indicating formation of the LDH structure in all cases. The interlayer metal-metal peak at ~8A for the Co—Al LDH in FIG. 1D is also consistent with the interplanar spacing observed by STEM in FIG. 1B. Synthesis of a LH using only Co(II) without M$^{3+}$ cations resulted in a qualitatively different PDF (top of FIG. 1D), which was fit using a Co(OH)$_2$ LH structure without interplanar anions.

Figure 1F:
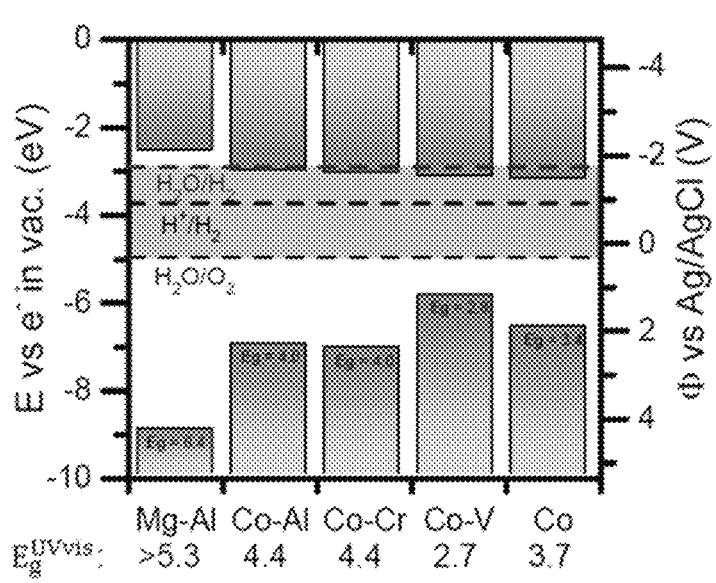
Figures 1G, 1H:
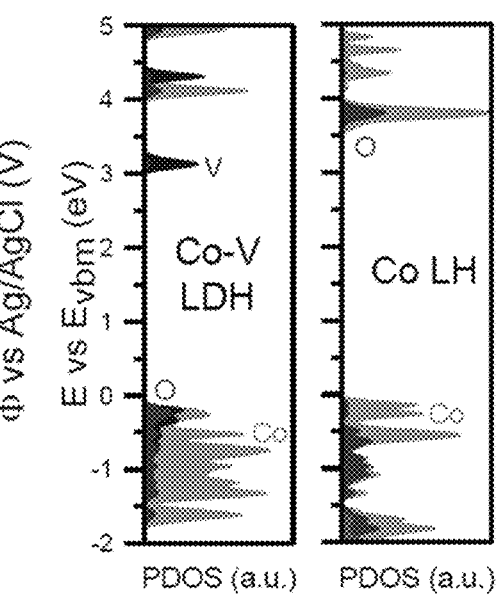

Initially, we hypothesized that the conduction band edge energy would determine the potential at which anion insertion occurs in an LH. As a negative bias is applied and increases the fermi energy of the electrode, we expected that electrons would transfer into the material when the conduction band edge energy is reached, driving reduction of the LH and leading to reversible anion insertion according to M(III)(OH)$_6$Cl+e$^-$ ⇌ M(II)(OH)$_6$+Cl$^-$. Based on this picture, we computationally evaluated the band edge positions for the LHs synthesized in FIG. 1D (rigid band model) using the idealized 2:1 M$^{2+}$-M$^{3+}$ molar ratio LDH structure depicted in FIG. 1E. By calculating the fermi level energy of the bulk material with respect to an electron in vacuum in this way, we determine the absolute band edge positions as presented in FIG. 1F. Our computational results show that composition strongly impacts the electronic properties of the LH structures, which are predicted to have band gaps ranging from 2.8 eV (Co-V) to 6.4 eV (Mg—Al). We also note that the computed band gaps for the LH structures in FIG. 1F are in agreement (within 0.4 eV) of experimental band gaps reported beneath FIG. 1F determined using ultraviolet-visible (UV-Vis) spectroscopy. Of the compositions presented in FIG. 1D, we selected the Co-V and Co LHs for further analysis because our ab initio modeling predicted their conduction band edge positions lie at the lowest energies. Projected density of states (PDOS) for Co-V and Co LHs are presented in FIGS. 1G and 1H, respectively. The conduction band edge of the Co-V LDH is predicted to be V-character, whereas the conduction band edge of the Co LH is predicted to be Co-character. We expected these species to take on electron density under applied negative bias.

Figure 2A:
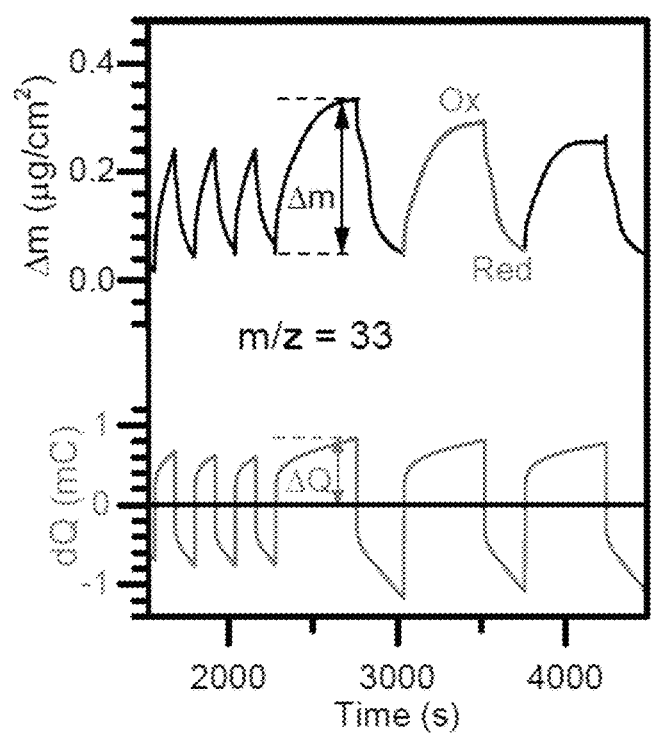
FIG. 2A shows EQCM measurement on Co LH cycled under potentiostatic control between −0.4 V vs. Ag/AgCl and +0.2V vs. Ag/AgCl, indicating anion insertion under oxidizing potential (shown in FIG. 2B) and anion removal under reducing potential (shown in FIG. 2C).
Figure 2B:
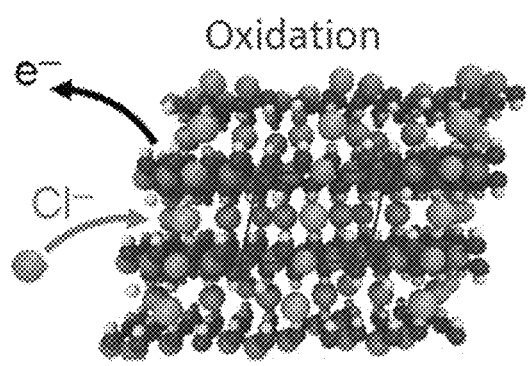
FIG. 2 shows Cl⁻ insertion in Co LH observed by EQCM.
Figure 2C:
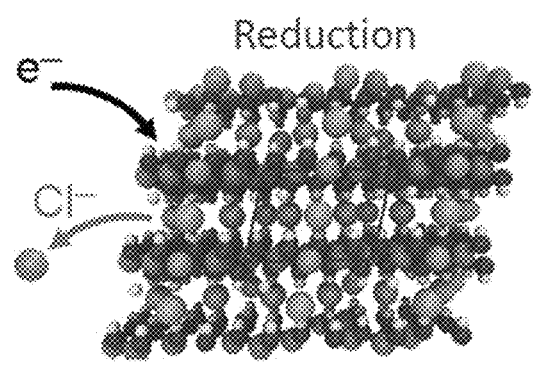

However, electrochemical evaluation of the Co-V and Co LHs yielded a surprising result. While we do observe reversible anion insertion electrochemistry in both the Co-V and Co LHs, sit occurs under oxidizing (positive) potentials rather than reducing (negative) potentials as we hypothesized. Presented in FIG. 2A is electrochemical quartz crystal microbalance (EQCM) trace for the Co-only LH. In these EQCM measurements the working electrode is the titanium surface of a quartz resonator, which can be used to measure in situ mass changes during electrochemical operation. Here we observe compelling evidence of anion insertion when cycling under positive bias between +0.2 V and −0.4 V vs. Ag/AgCl. We observe a monotonic mass gain under positive potential (oxidation) and mass loss under negative potential (reduction). This is qualitatively consistent with anion insertion-under applied positive bias, Cl$^-$ is drawn into the Co LH structure as depicted in FIG. 2B, and under applied negative bias Cl$^-$ is expelled from the Co LH structure as depicted in FIG. 2C. The region marked with dashed lines and arrows in FIG. 2 yields a calculated m/z of 32.9 g/mol e$^-$, in close agreement with the value of 34.5 g/mol e$^-$ expected for stoichiometric Cl$^-$ insertion. The six cycles shown in FIG. 2 yield an average m/z of 30.2±2.8 g/mol e$^-$ on the oxidizing sweep, and 23.0±2.6 g/mol e$^-$ on the reducing sweep. The lower value on the reducing sweep indicates some irreversibility, which we attribute to ion-decoupled electron transfer as described elsewhere. This evidence for anion insertion provides strong support for Cl$^-$ insertion in Co LH under oxidizing potentials.

Figure 3A:
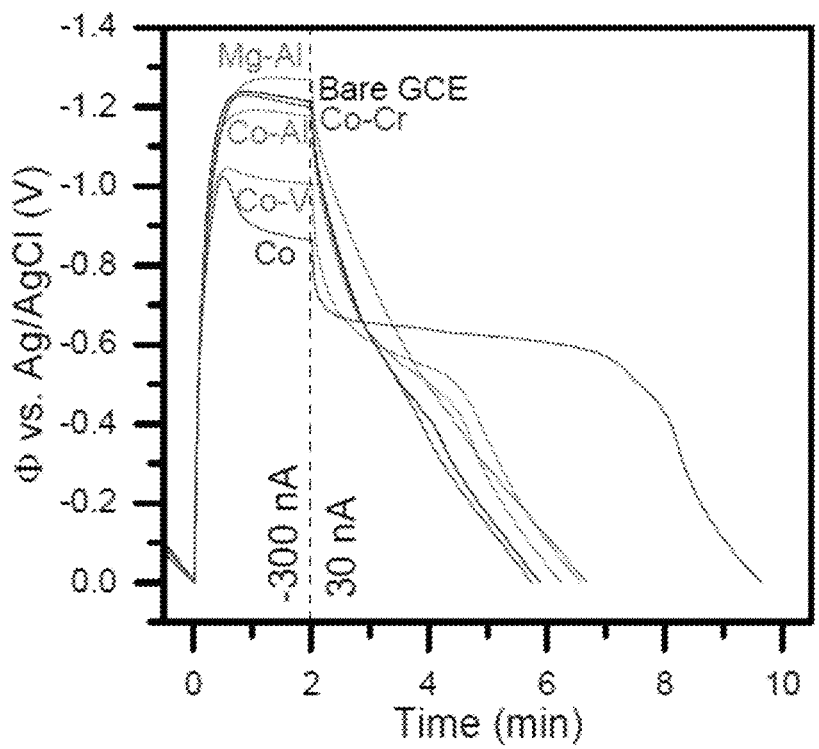
FIG. 3A shows experimental electrochemical results under galvanostatic operation indicating reductive electrochemistry for Co, Co—Al, and Co-V LHs.

In order to reconcile the unexpected potential region for anion insertion, we more closely examine the electrochemical behavior of various LHs under negative potential conditions. Under applied negative current, the Fermi level in each LH (FIGS. 1D and 1E) increases, corresponding to more negative potentials for the experimental measurements in FIG. 3A. By the rigid band description in FIG. 1D, electrons are expected to transfer into unoccupied V orbitals (FIG. 1E) in the Co-V structure at a potential of −1.5V vs Ag/AgCl (FIG. 1D). While we do observe a plateau in potential for Co-V LH in FIG. 3A, it is at a significantly lower potential of ~−1.0V vs. Ag/AgCl, at odds with the rigid band description. Additionally, we observe a plateau at a similar potential to the Co-V LDH for the Co—Al LDH and a plateau at a dramatically lower potential for the Co-only LH, neither of which are predicted by the rigid band description. We attribute the irreversible charge transfer at −1.2V vs. Ag/AgCl for the bare glassy carbon electrode (GCE), as well as Mg—Al LDH, and Co—Cr LDH measurements to the onset of the hydrogen evolution reaction (HER), which precludes the study of these LHs at more reducing potentials. Upon switching to a positive current at a time t=2 min in FIG. 3A, the Fermi level decreases, and electrons transfer back out of the Co-V, Co—Al, and Co LH structures, leading to plateaus in potential under positive current as depicted in FIG. 3A. The width of the plateau corresponds to the amount of charge transferred. We observe the widest plateau for the Co LH, corresponding to 36% coulombic efficiency, while ~20% coulombic efficiencies are observed for the Co-V, and Co—Al LHs.

Figure 3B:
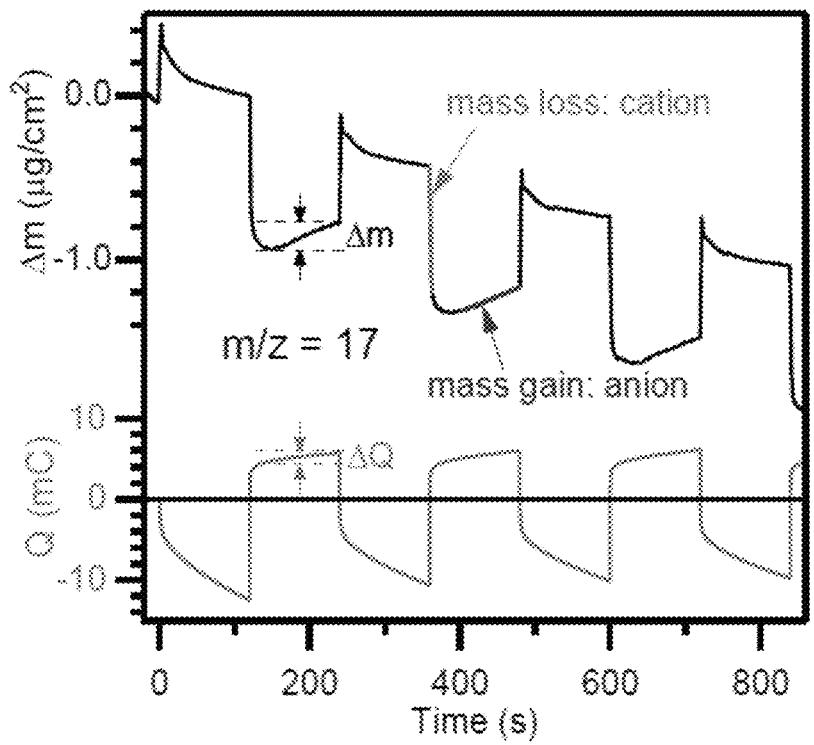
FIG. 3B shows EQCM measurement on Co-V LDH under potentiostatic cycling between −1.0V and −0.5V vs. Ag/AgCl, identifies rapid cation-based mechanism followed by slower anion-based mechanism under applied negative bias.

We again employ EQCM here to understand the electrochemical behavior of these LHs under negative bias. The results from an EQCM measurement on the Co-V LH platelets is depicted in FIG. 3B. We attribute the overall decrease in mass for the Co-V LDH in FIG. 3B to the delamination of the LH particles and dissolution of V (vide infra) during operation. For anion insertion charge storage, one would expect a mass loss under applied negative bias and a mass gain under applied positive bias. The predominant signal we measure in FIG. 3B is the inverse of this, with a mass gain under applied negative bias (−1.0V vs. Ag/AgCl), and a mass loss under applied positive bias (−0.5V vs. Ag/AgCl). This is at odds with anion insertion, and suggests a cation-based mechanism, such as the reversible formation of Co or V vacancies or the insertion of electrolyte cations (e.g., $Na^+$) into the structure. We also observe a slower process following the initial mass spikes, highlighted with the dashed lines in FIG. 3B, which is consistent with an anion-based mechanism. However, the mass-to-charge ratio (m/z) we derive from the slopes highlighted in FIG. 3B is m/z=17 g/mol $e^−$, which agrees precisely with the mass-to-charge ratio expected for OH— and strongly suggests that OH—, not $Cl^−$, is the species involved in this process.

To better understand this electrochemical behavior, we expand upon the rigid band description and employ the UEB construct to model the thermodynamics of charged defects in LH structures under applied bias. We emphasize that conventional $\Delta E_{rxn}$ calculations versus a metallic reference commonly employed for studying cation insertion cannot be employed here because (a) no convenient electrochemical reference (e.g., bulk metal) is available for $Cl^−$ anions, and (b) the reactions occurring may involve multiple species. Within the UEB construct, an applied bias shifts the Fermi level within the band gap of these LH structures, and drives structural perturbations and the formation of charged defects and electronic states inside the band gap. In defect plots (i.e., FIGS. 4 and 17), the formation energy, $\Delta E_f$, is calculated for various defect charge states while accounting for the applied bias and electrolyte pH. A structural change is predicted to exist at a given potential when a given defect has a $\Delta E_f<0$, and that defect is expected to give rise to charge transfer when it changes charge state—corresponding to the kinks marked with symbols. Using the UEB computational framework we predict electrochemical behavior which agrees with our experimental observations as discussed below.

STEM and ICP-OES analysis of the Co-V sample indicate a blend of V-rich $Co_3V(OH)_8Cl$ ($Co_3V$ LDH) and V-deficient $Co_3(OH)_6Cl$. In order to understand the electrochemical behavior of the Co-V LDH in FIG. 3B, we study both V-rich $Co_3V$ LDH and V-deficient $Co_3(OH)_6Cl$ LH within the UEB construct. We examine vacancy, substitution, and interstitial point defects at various charged states within these structures. V-rich $Co_3V$ LDH domains in the Co-V LH sample do not contribute to the reversible charge storage we observe in FIGS. 3A and 3B—no defects in the $Co_3V$ LDH are predicted to be thermodynamically favorable and change charge state in the potential range of {0,−1.0} V vs. Ag/AgCl. Based on these calculations, electrochemical insertion of Cl— into the $Co_3V$ LDH requires a potential >0.4V vs. Ag/AgCl, and anion extraction requires a potential <−1.6V vs. Ag/AgCl. Additionally, V vacancies ($v_v$) are predicted to be highly favorable ($\Delta E_f<-2$ eV), driving the conversion of Co3V LDH to Co LH. Considering this, we examine the UEB construct of $Co_3(OH)_6Cl$, as presented in FIG. 4. We use the chlorinated Co LH for this study to enable the study of chloride vacancies. We note that this structure we use for modeling nominally contains a mixture of both Co(II) and Co(III).

The predicted electrochemistry of the Co LH is in line with our experimental observations. First, UEB calculations on $Co_3(OH)_6Cl$ provide an explanation for the cation-mediated mechanism we observe for the Co-V sample in FIG. 3C. Under reducing current, at −1V vs. Ag/AgCl protons on Co vacancies ($H_{Co}$) are predicted to exchange for V on Co vacancies ($V_{Co}$), giving rise to charge transfer and cation uptake. In other words, V ions which have dissolved from the Co-V sample will reinsert into Co vacancies under applied negative bias. When the current is reversed to oxidizing conditions, the V is predicted to go back into solution and be replaced by a proton. Considering how rapidly these processes proceed in FIG. 3B, the Co vacancies responsible for this mechanism likely reside at the edges of LH platelets, allowing for rapid V uptake.

Secondly, UEB calculations on $Co_3(OH)_6Cl$ predict the formation of $Cl^−$ vacancies at a potential more negative than −0.7V vs. Ag/AgCl. This may contribute to the anionic charge storage observed in FIG. 3B, but only to a limited extent (see discussion below). Also, considering the measured m/z of 17 g/mol $e^−$, OH— is likely responsible for the anion mechanism in FIG. 3B. We note that that at a pH of 10, the Pourbaix diagram for cobalt predicts that potentials more negative than ~0.6V vs. Ag/AgCl will drive the reduction of $Co(OH)_2$ to form metallic Co, depicted by the vertical dashed line in FIG. 4. This process is likely responsible for the anion mechanism measured in FIG. 3B, and is consistent with the plateau observed for the Co LH measured in FIG. 3A. Extensive structural reorganization necessary to convert $Co(OH)_2$ to metallic Co will limit the rate of this process, in line with the slow rate of the anion-mediated process in FIG. 3B. We note that the UEB calculations we perform do not capture the conversion of $Co(OH)_2$ to Co because we limited our modeling to incremental structural changes, and did not evaluate complete structural reorganizations.

Although our calculations indicate that reversible anion incorporation does not occur in the Co-V LDH under applied negative bias, the UEB model predicts that $Cl^−$ insertion is expected to take place in $Co_3(OH)_6Cl$ under positive bias as we observe in FIG. 2. Examining the $v_{cl}$ trace in FIG. 4, the formation energy of $v_{cl}$ is greater than zero at potentials more positive than −0.8V vs. Ag/AgCl. This suggests $Cl^−$ will insert into interplanar $v_e$ sites in this potential region. However, the corresponding electron transfer (kink in trace marked by a symbol) is not predicted to occur until potentials >0.1V vs. Ag/AgCl. Based on these calculations, we expect charge accumulation will limit the extent of $Cl^−$ insertion into $v_{cl}$ sites until a potential >0.1 vs. Ag/AgCl is reached, at which point electron transfer will take place, driving additional incorporation of $Cl^−$ into interplanar $v_{cl}$ sites. We also note that Pourbaix diagrams for Co suggest a transition from $Co(OH)_2$ to $Co(OH)_3$ at potentials >0.1V at a pH of 10 as indicated by the vertical dashed line in FIG. 4. The nominal change in oxidation state from Co(II) to Co(III) suggested by the Pourbaix diagram is expected to coincide with $Cl^−$ insertion according to $M(II)(OH)_6+Cl^− \rightleftharpoons M(III)(OH)_6Cl+e^−$. This Pourbaix description is consistent with the prediction of $Cl^−$ insertion in FIG. 4.

Figure 4:
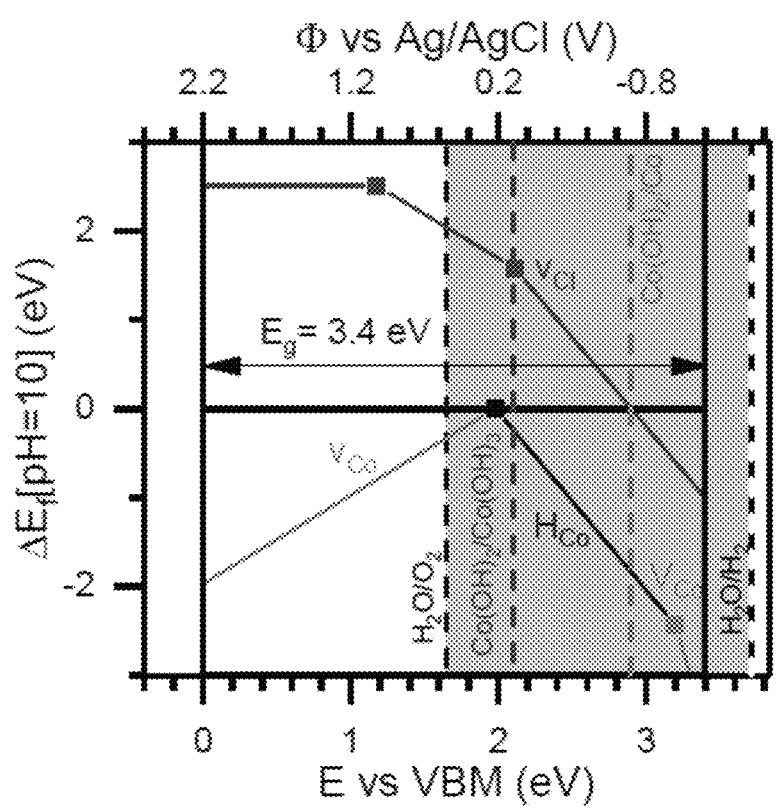
FIG. 4 shows UEB model of $Co_3(OH)_6Cl$. Ab initio modeling of $Co_3(OH)_6Cl$ identifies $v_{Co}$, and Cl⁻ mediated electrochemical mechanisms. Vertical dashed lines represent H2O (black) stability and Co (purple and red) phase change reactions based on a Pourbaix construct.
Figure 5A:
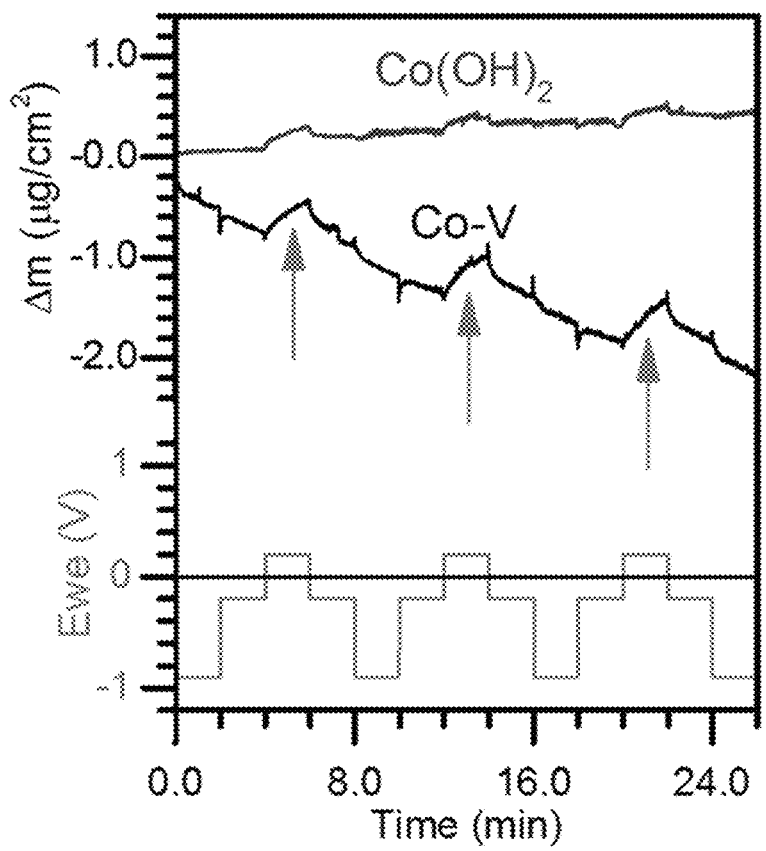
FIG. 5A shows EQCM cycling of Co-V and Co LH reveals anion-based mechanism under applied positive bias (+0.2V vs. Ag/AgCl). This is corroborated by FIG. 5B, which shows in situ HE-XRD and PDF analysis of Co-V showing, as can be seen in FIG. 5C, changes in G(r) intensity when switching from (1) −0.2V vs. Ag/AgCl to (2)+0.2V vs. Ag/AgCl, and back to (3) −0.2V vs. Ag/AgCl consistent with reversible insertion of interplanar anions. Little change in G(r) was observed under (4) −0.9V vs. Ag/AgCl.

Based on this UEB modeling in FIG. 4 and Pourbaix diagram description, we expect that anion insertion will occur in the Co-V LDH sample under applied positive bias, arising from domains of Co LH. To evaluate this, we examine in situ EQCM, HE-XRD, and XAS data for Co-V LH platelets cycled in potential loops of {−0.9V, −0.2V, +0.2V, −0.2V}. We first examine the EQCM data in FIG. 5A. We attribute the overall decrease in mass of the Co-V LDH to the favorable dissolution of V as predicted from UEB modeling. The potential-dependent mass changes for both the Co-V and Co LH samples in FIG. 5A are consistent with anion insertion. We observe a mass gain under positive bias (+0.2V) highlighted with blue arrows as anions are drawn into the interplanar space of the LHs, and a mass loss under reverse bias as anions leave the LHs. The similarity in results for the Co-V and Co LH samples in FIG. 5A supports the prediction that anion insertion takes place in Co LH domains of the Co-V LH sample. These results are also consistent with the EQCM results for the Co LH presented in FIG. 2A.

Figure 5B:
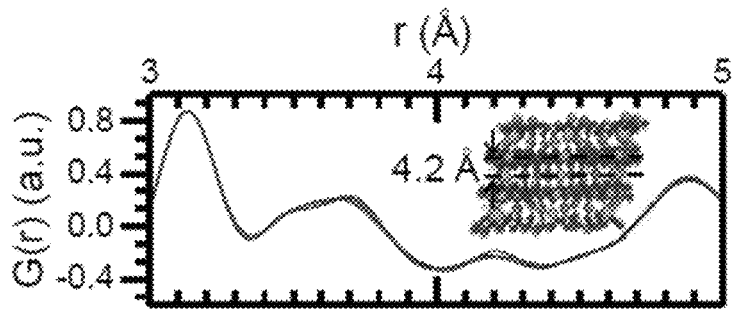
FIG. 5 shows EQCM and HE-XRD during oxidation of Co-V and Co LHs.
Figure 5C:
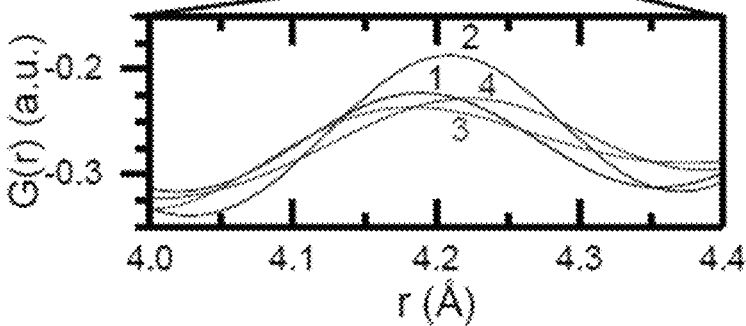

We also performed in situ HE-XRD measurements using a custom electrochemical cell to elucidate the structural changes during electrochemical cycling. Depicted in FIG. 5B are PDFs calculated from in situ HE-XRD data during electrochemical operation. In these traces, we observe a peak at a pair distance of r=4.2 Å which corresponds to the distance between interplanar anions and metal ions in the hydroxide sheets. Twice this distance corresponds to the interplanar spacing, here 8.4 Å. This is larger than the interplanar distance of ~8 Å observed in FIG. 1D. We attribute the increase in interplanar distance here to the use of the Br— anion for in situ measurements—the diameter of Br— is 3.92 Å, while the diameter of Cl—is 3.62 Å. We interpret an increase in G(r) intensity at r≈4.2 Å in FIGS. 5B and 5C as an increase in the number of interplanar anions. In FIG. 5C, G(r) intensity increases at r≈4.2 Å when switching from −0.2V (trace 1) to +0.2V (trace 2) vs. Ag/AgCl, indicating the incorporation of anions at +0.2V. G(r) intensity then decreases at r≈4.2 Å when switching from +0.2V (trace 2) to −0.2V (trace 3) vs. Ag/AgCl, indicating the release of interplanar anions. Furthermore, we note little change in the G(r) intensity at r≈4.2 Å when switching from −0.2V (trace 3) to −0.9V (trace 4) vs. Ag/AgCl, further corroborating our conclusion that interplanar anions do not leave the structure under negative bias. These HE-XRD results are consistent with the EQCM results presented above.

Figure 6A:
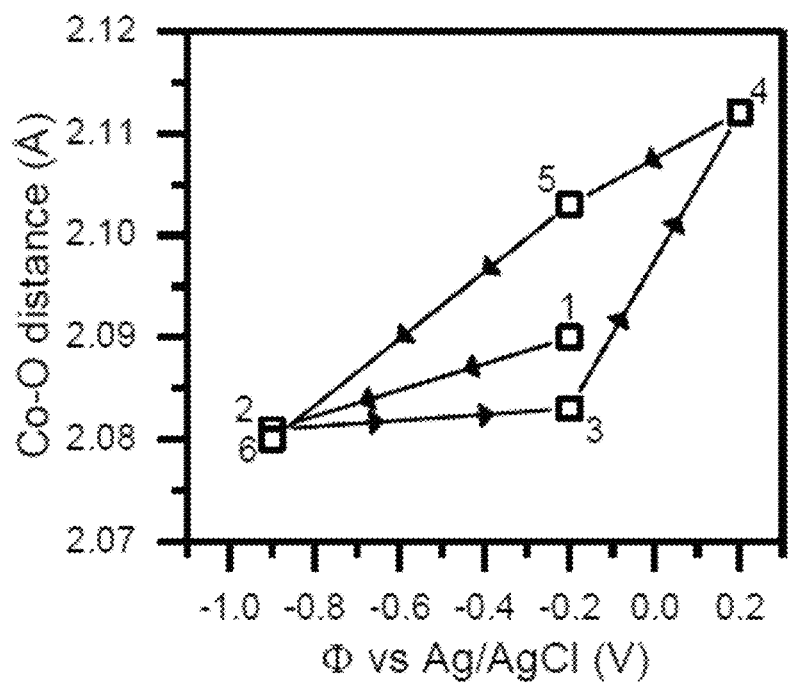
FIG. 6A shows changes in Co—O distance.
Figure 6B:
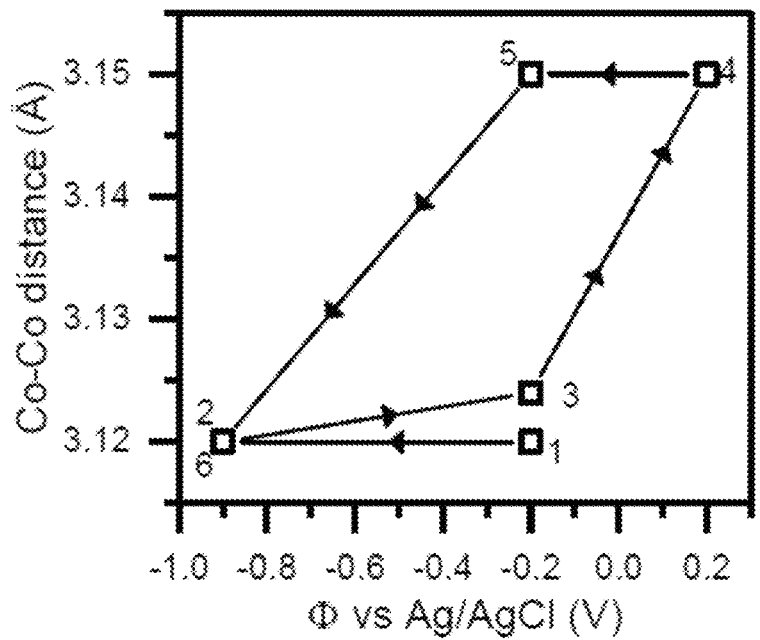
FIG. 6B shows changes Co—Co distance from in situ XAS measurements during potentiostatic electrochemical operation. The bond-length changes observed are consistent with the formation of charged $v_{Co}$ sites in the Co3(OH)6Cl structure.

While EQCM and PDF analysis provide strong support of electrochemical anion insertion in Co LH domains of the Co-V LDH sample, EXAFS measurements on the Co-V LDH over longer timescales suggests a competing Co dissolution mechanism. See supporting information for details on EXAFS experimentation. The results of steady-state EXAFS measurements are depicted in FIG. 6, which indicate that the Co—Co/V nearest neighbor distance increases from 3.12 Å to 3.15 Å, and the Co—O nearest neighbor distances increase from 2.08 Å to 2.11 Å when switching from −0.2V to +0.2V vs. Ag/AgCl. While ab initio modeling predicts minimal changes in the Co—Co and Co—O distances due to Cl⁻ insertion, these structural changes are in line with the formation of $v_{Co}$ at this potential. Ab initio calculations for the formation of Co vacancies near V dopants (modeled in the $Co_3V(OH)_8Cl$ structure) predict these defects to occur at potentials >+0.2V vs. Ag/AgCl in FIG. 3D, leading to an increase the average Co—Co distance from 3.01 Å in the perfect structure to 3.14 Å in a charged $v_{Co}$ structure, and an increase in the average Co—O distance from 2.06 Å in the perfect structure to 2.09 Å in a charged $v_{Co}$ structure. However we do not observe indicators for this mechanism in EQCM or PDF measurements. The formation of $v_{Co}$ may proceed at too slow of a rate to be observed during relatively fast EQCM and PDF measurements (minutes timescale), but allowing for observation at the timescale of our EXAFS measurement (hours timescale).

Figure 9:
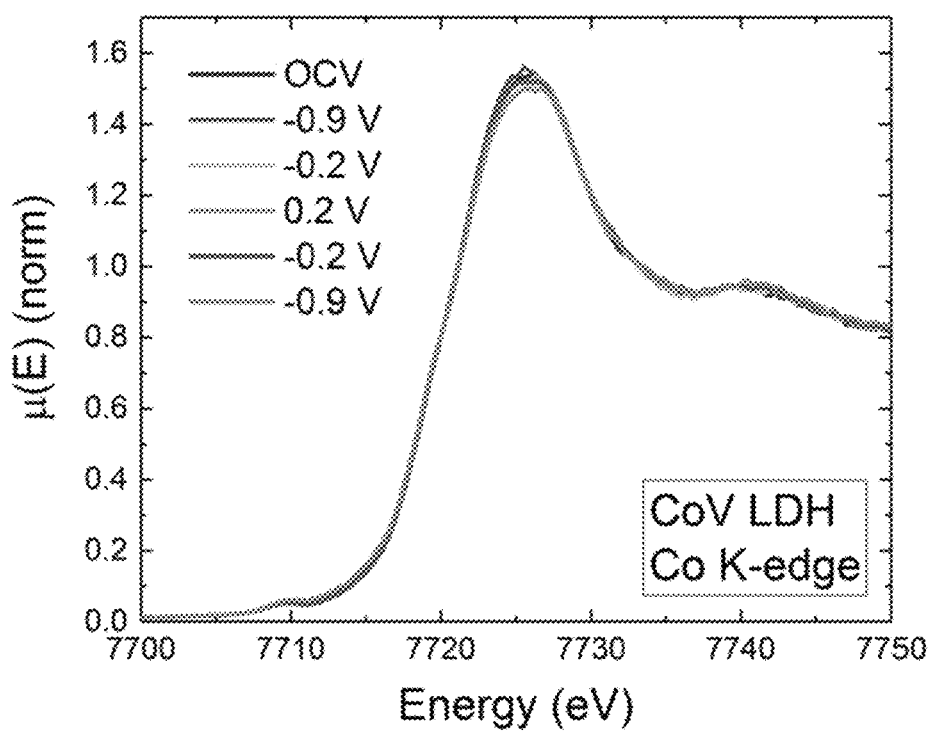
FIG. 9 shows in situ electrochemical XANES at the Co K-edge. XANES measurements at various potentials vs. Ag/AgCl in order of the potential holds applied during each experiment.
Figure 10A:
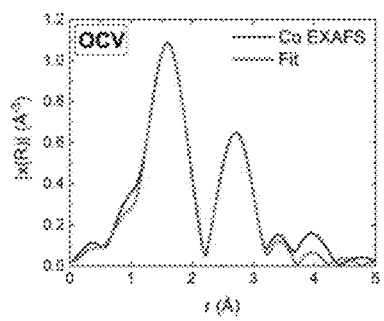
FIG. 10 shows co K-edge amplitude EXAFS fitting results. EXAFS fitting results shown as a function of the amplitude for: open circuit voltage (FIG. 10A), −0.9V (FIG. 10B), −0.2V (FIG. 10C), 0.2V (FIG. 10D), −0.2V (FIG. 10E) and −0.9V (FIG. 10F). All potentials are referenced against Ag/AgCl and were performed in sequential order.
Figure 10B:
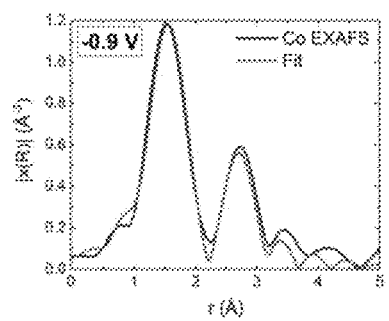
Figure 10C:
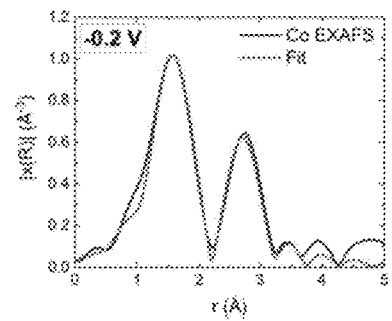
Figure 10D:
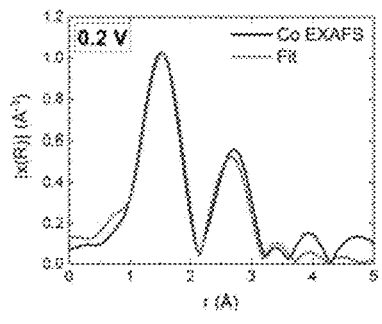
Figure 10E:
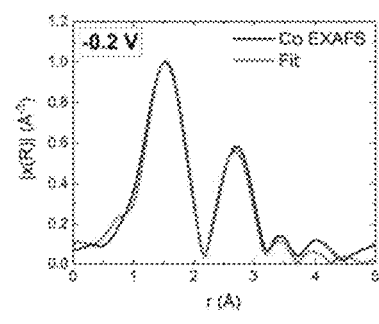
Figure 10F:
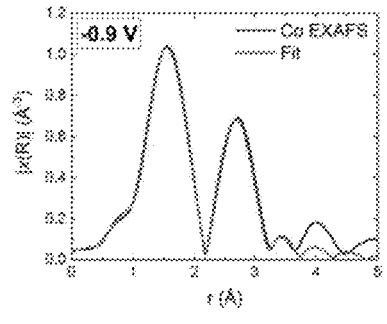
Figure 11A:
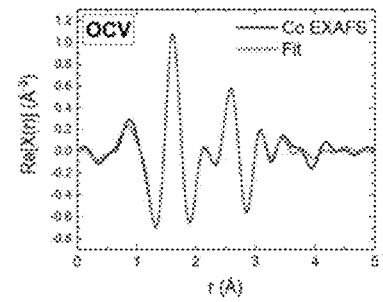
FIG. 11 shows co K-edge real-space EXAFS fitting results. EXAFS fitting results shown in real space for: open circuit voltage (FIG. 11A); −0.9V (FIG. 11B); −0.2V (FIG. 11C), 0.2V (FIG. 11D), −0.2V (FIG. 11E) and −0.9V (FIG. 11F). All potentials are referenced against Ag/AgCl and were performed in sequential order.
Figure 11B:
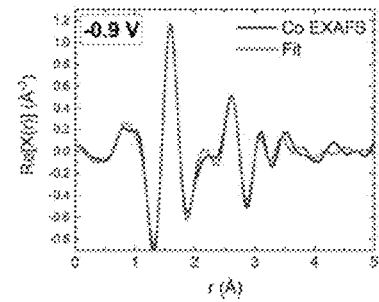
Figure 11C:
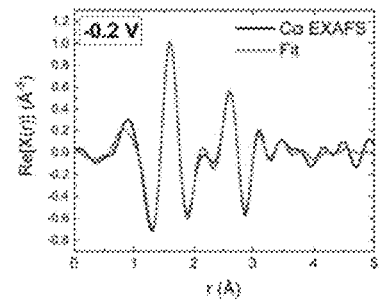
Figure 11D:
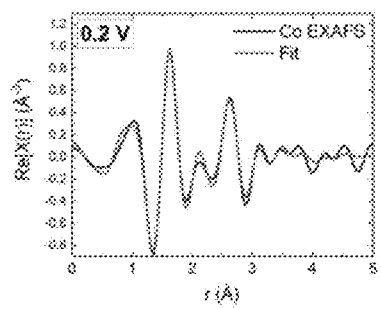
Figure 11E:
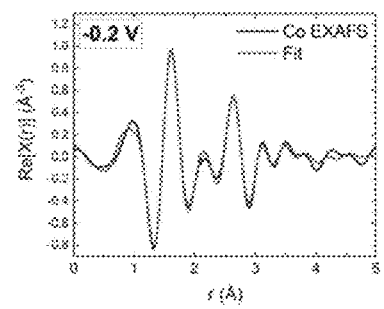
Figure 11F:
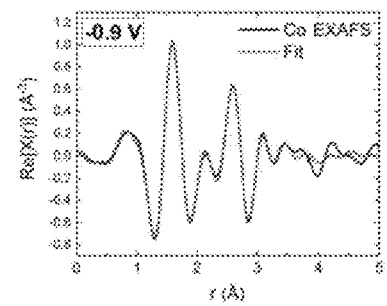

We also note that we do not observe changes in Co oxidation state in the X-ray absorption near-edge spectrum (XANES) at various applied biases (FIG. 9). While a change in the charge state of Co ions is not requisite during charging of the Co LH for anion insertion, a charge state change is expected for the formation of metallic Co under applied negative bias (−0.2V), as described above. The absence of zero-valent Co in the XANES data under negative bias may suggest that the thermodynamic description laid out in the Co Pourbaix diagram does not fully capture the processes occurring under negative bias, or that only a small fraction of metallic Co forms during EXAFS measurements. More importantly, these findings suggest that additional work is needed to further understand the electrochemical processes in these promising materials.

The experiments establish the electrochemical mechanisms occurring in Co and Co-V LH in aqueous electrolyte under both negative and positive applied bias. Under applied negative bias, we identify mechanisms for cation exchange (V insertion on Co site) and phase change (OH⁻ removal to form metallic Co). Under positive bias, we observe electrochemical anion insertion-anions are drawn into the interplanar spaces of the LHs under positive bias, and driven out under reverse bias. We also observe evidence of slow dissolution of Co under positive bias. Our data suggests that Co LH enables anion insertion electrochemistry within the potential limits of water stability, while larger potentials are needed for anion insertion in other Co-containing LHs (e.g., $Co_3V$ LDH). With further refinement to prevent dissolution, enhance ion insertion rates, and improve stability, LHs based on this work could be designed to be paired with a cation insertion electrode material and used for energy efficient electrochemical desalination.

The mechanistic understanding of layered hydroxide electrochemistry we establish also has far-reaching implications in other fields. Doping LHs to shift band edge positions and impact defect energy levels provides a means to enhance desired (photo)electrocatalytic pathways. Similarly, pairing two anion insertion processes which occur at different potentials in LHs allows for the fabrication of an anion-based battery for energy storage. Our work predicts that one LH structure with different levels of anion content could be used as both the anode and cathode in such a device, however, pairing two LHs is also possible. Furthermore, the controlled release of anions using (photo)electrochemical stimulus has potential use in biomedical applications-allowing a pathway for spatially-controlled delivery of therapeutic polyanions, including DNA or RNA fragments.

Example II—In Situ Measurement and Quantum Simulations of a LDH as an Anion Intercalation Electrode for Battery-Inspired Water Desalination In situ measurement and quantum simulations were performed for a LDH as an Anion Intercalation Electrode for water desalination develop a fundamental understanding of the electrochemical properties of LDHs through the combination of electrochemistry, in situ X-ray experiments and modeling. Using $Mg_{0.66}Al_{0.33}(OH)_2$ as a model system, the proposed experimental and computational work can uncover the fundamental anion incorporation characteristics of these materials under applied bias, while potentially providing a readily adaptable methodology for studying other systems in the future.

$Mg_{0.66}Al_{0.33}(OH)_2$ as Model LDH System: $Mg_{0.66}Al_{0.33}(OH)_2$ will be used as the model system for this study due to its simple synthesis, including known methods for its nanoparticle synthesis, the ability for it to intercalate $CO_3^{2-}$, Cl⁻, and other anions, the large negative standard reduction potentials of $Mg^{2+}$ and $Al^{3+}$, and for the wealth of experimental characterization on $Mg_{0.66}Al_{0.33}(OH)_2$. Indeed, the first experimental study in 1982 showing interlayer spacing changes with intercalated anions were performed on this system.

Nanoparticle synthesis of $Mg_{0.66}Al_{0.33}(OH)_2$ will be carried out according to the methods from Xu et al. This synthesis expands on the standard coprecipitation technique for LDH synthesis and will take advantage of current expertise and experimental capabilities for aqueous-based synthesis techniques at NIST Boulder. Concisely, this method involves the reaction of $MgCl_2$ with $AlCl_3$ in an aqueous NaOH solution under vigorous stirring, followed by centrifuge separation and hydrothermal treatment. It has been shown that the hydrothermal treatment conditions following reaction affect the resulting nanoparticle size. By adjusting the hydrothermal treatment temperature and time, the mean nanoparticle diameter of $Mg_{0.66}Al_{0.33}(OH)_2$ can be tuned continuously from 40 nm up to 300 nm.

Figure 20:
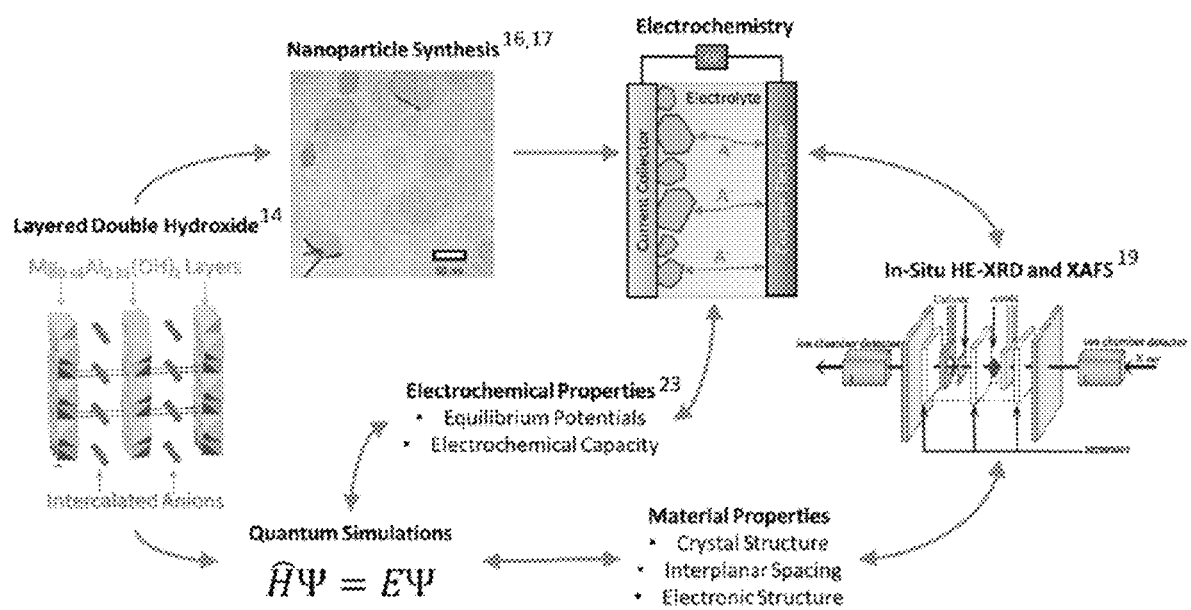
FIG. 20 shows an overview of proposed study of anion intercalation in an $Mg_{0.66}Al_{0.33}(OH)_2$ layered double hydroxide using quantum simulations and in situ HE-XRD and XAFS.

Characterization of Nanoparticulate $Mg_{0.66}Al_{0.33}(OH)_2$: Following nanoparticle synthesis, the composition and particle size distribution of the synthesized nanoparticulate $Mg_{0.66}Al_{0.33}(OH)_2$ will be measured using a range of tools available at NIST Boulder's Precision Imaging Facility. These include transmission electron aberration corrected microscopy (TEAM), scanning helium ion microscopy (SHIM), and atom probe tomography (APT). TEAM and SHIM micrographs will be processed to quantify particle size distribution in the synthesized $Mg_{0.66}Al_{0.33}(OH)_2$ powders. Additionally, both electron diffraction in the TEAM, and elemental composition from APT will be used to verify formation of $Mg_{0.66}Al_{0.33}(OH)_2$. These same characterization techniques will be used following electrochemical cycling to measure the changes in the $Mg_{0.66}Al_{0.33}(OH)_2$. FIG. 20 shows and over of a study of anion intercalation in an $Mg_{0.66}Al_{0.33}(OH)2$ layered double hydroxide using quantum simulations and in situ HE-XRD and XAFS.

In situ Observation of Electrochemical Anion Insertion/Extraction in $Mg_{0.66}Al_{0.33}(OH)_2$: In order to understand structural changes in the layered double hydroxides and chemical environment of intercalated ions under applied bias, in situ HE-XRD and in situ XAFS will be performed. Electrochemical measurements will be carried out in custom cells optimized for in situ HE-XRD and XAFS measurements on NIST's Beamline for Materials Measurement (BMM) at the National Synchrotron Light Source II (NSLS-II) in Brookhaven National Laboratory and under the guidance of several researchers at NIST Boulder who currently conduct in situ HE-XRD and XAFS experiments for various nanoparticle materials.

In order to make electrochemical measurements, nanoparticulate $Mg_{0.66}Al_{0.33}(OH)_2$ will be applied to an electrically conductive metal current collector using a binder. Synchrotron measurements will be performed with the electrochemical cell at a fixed potential after sufficient time for equilibration. This will provide higher resolution data as compared to cyclic voltammetry or other dynamic cycling techniques. To mimic electrochemical cycling, the fixed potential will be adjusted and snapshots of the system will be measured at different states of charge. The electrolyte used for electrochemical measurements will be an aqueous sodium salt electrolyte where the counter-ion to sodium is the anion to be studied for electrochemical intercalation in the LDH. Initially the carbonate anion will be studied due to its easy compatibility with most construction materials. Chloride, which is more relevant to CDI, will also be studied after modifying the electrochemical cell to remove any metal which is incompatible with chloride solutions.

HE-XRD and XAFS have been used widely to study the electrochemical processes taking place in cation intercalation materials for lithium ion batteries. Prior in situ studies on $LiMn_2O_4$, $LiSeS_x$, $LiMn_3O_4$, $Li_xSi$, and other electrode materials have demonstrated the ability to clearly identify changes in crystallinity, interatomic distances, and atomistic environment during electrochemical cycling. These techniques provide unsurpassed understanding of the mechanisms of charge storage during electrochemical cycling for cation intercalation materials, but have not previously been used to study LDHs.

Here, we propose the first use of HE-XRD and XAFS for in situ study of an anion intercalation material. Using XAFS, the local coordination of the anion to either Mg or Al, as well as the distance between the anion and Mg/Al centers can be observed directly under an applied bias. Additionally, the crystalline peaks in the LDH, including those corresponding to interlayer spacing in the LDH, can be observed using HE-XRD during electrochemical cycling. The interlayer spacing is expected to change during insertion/extraction of anions and can be accurately measured with HE-XRD. HE-XRD will provide long-range crystal structure information during cycling, which, coupled with the local anion environment from XAFS will give a precise description of the atomic structure, and will provide insight for computational modeling. Furthermore, XAFS data measured near the absorption edge (XANES analysis) will allow for electronic structure determination near the Fermi level. This analysis will be paired with quantum simulations to understand the fundamental basis for the observed equilibrium potentials for anion insertion/extraction (vide infra). Coupled with electrochemical measurements, HE-XRD and XAFS will allow us to directly observe the insertion and extraction of anions into the LDH structure and the corresponding changes in electronic structure under an applied bias.

Quantum Simulations of $Mg_{0.66}Al_{0.33}(OH)_2$: Computational modelling of $Mg_{0.66}Al_{0.33}(OH)_2$ will provide a fundamental basis for understanding measured electrochemistry and synchrotron characterization results. Quantum mechanical calculations will be performed using the VASP on NIST's Raritan cluster. Bulk calculations will be corrected for surface and near-surface behavior characteristic of the measured nanoparticles by using pH and band-bending corrections. In situ HE-XRD and XAFS measurements will provide data on interlayer spacing, crystallinity, and atomistic environment changes under an applied bias to inform and be compared with computational results.

Calculations will be performed in two stages for efficiency and accuracy. The accuracy and speed of calculations depends in part on the selected exchange-correlation functional.

Specifically, equilibrium lattice parameters and band-gaps of Al and Mg-containing materials have been shown to be more accurate with the Heyd-Skusery-Ernzerhof (HSE) functional versus the than Perdew-Burke-Ernzerhof (PBE) functional, but the HSE functional is more computationally demanding than the PBE functional. So, initial calculations will be performed with PBE, while more accurate refinement calculations will be performed with HSE.

From the results of these quantum mechanical simulations, a fundamental description of anion insertion/extraction will be established. As described in prior work by the applicant, the equilibrium potential for anion insertion/extraction will depend on the electronic structure of the unintercalated host material and the interaction behavior of the anion with the host. Anion-host interaction behavior is expected vary depending on the interlayer spacing of the host and the type of intercalated anion. Thus, a range of experimentally relevant interlayer spacings and anions will be studied computationally and the corresponding changes in the electronic structure and equilibrium potential will be determined. These computational results are expected to reflect XANES measurements and provide a fundamental basis for understanding anion intercalation.

One application relates to the use of LHs for energy storage. Another application relates to the use of LHs for desalination.

In one embodiment, PLH in situ synthesis embedding LH/LDHs into a porous support. The support may be nanoporous, mesoporous, or microporous. In one embodiment, the pores are >10 nm in order to accommodate the LH nanoparticles and allow for ion/solvent movement through the pores. In one particular embodiment, the porous network would contain a majority of pores between 15 and 200 nm to accommodate the particle size distribution of the LH nanoparticles, with a fraction (i.e., 10-50%) of pores consisting of larger microporous channels to allow for diffusion to the smaller porous network. The support material, in one embodiment, is an electrically conductive material such as carbon.

Figure 18:
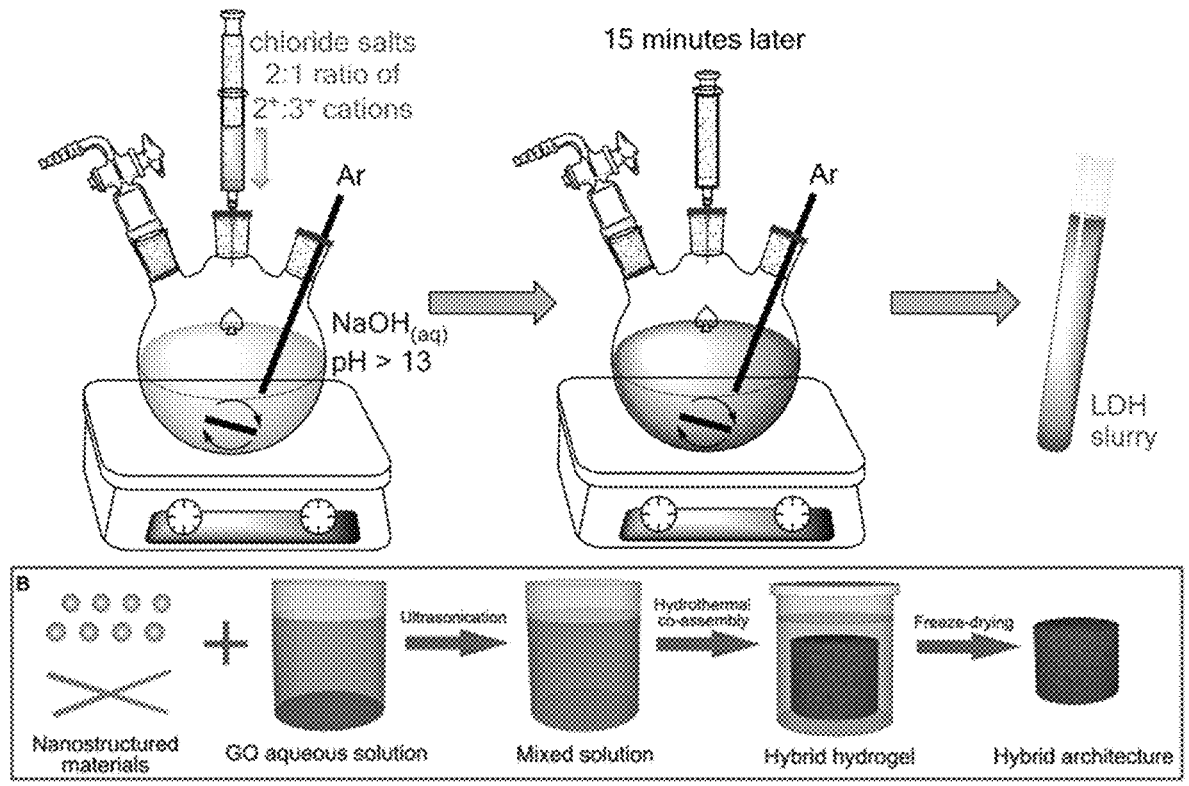
FIG. 18 illustrates one embodiment for synthesizing layered hydroxides embedded in a support material.

In one method of fabricating PLH embedded in a porous support, the conductive support is synthesized in a solution of LH/LDH nanoparticles, such as shown in FIG. 18. The LH nanoparticle size can be tuned by adjusting synthesis parameters, (less 3+ ion leads to smaller particles while longer hydrothermal treatment of LH particles at elevated temperature leads to larger LH) and tune the hydrogel porous network by adjusting hydrothermal formation conditions (higher temperature and longer time lead to smaller pores). Thus, the LH particle size and hydrogel pore size can be matched to improve ionic and electronic transport properties. As an example, LH hydrothermal formation at 125° C. for 2 hours followed by hydrogel hydrothermal formation at 100° C. for 4 hours In a first step, an LDH slurry is synthesized as described above. The LDH slurry is mixed with a graphene oxide (GO) aqueous solution and then sonicated to form a mixed solution. The mixed solution undergoes hydrothermal co-assembly to form a hybrid hydrogel in the solution. The hybrid hydrogel has a porous network with the LDH material disposed therein. The LDH and support hybrid material may be extracted such as by freeze-drying.

Figure 19:
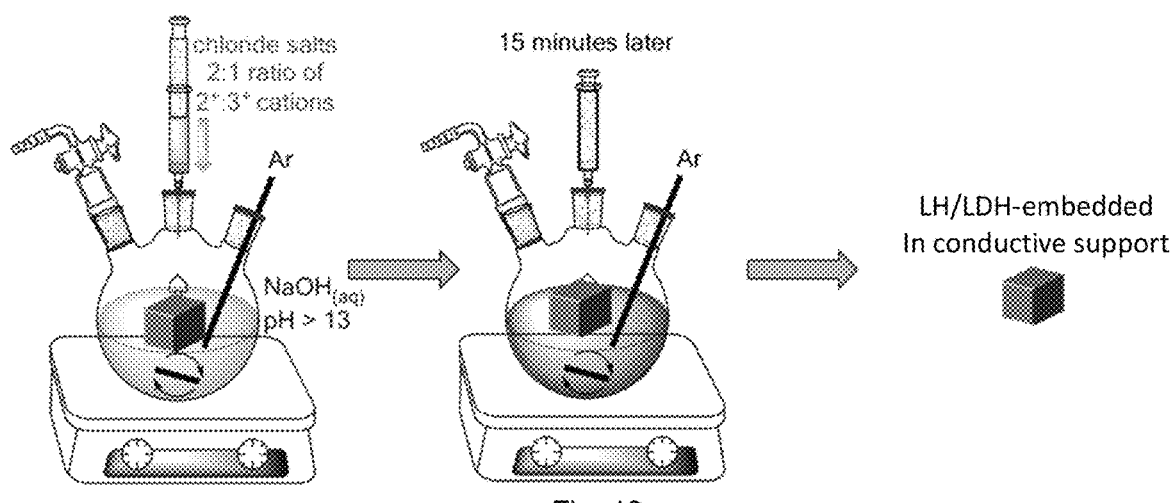
FIG. 19 illustrates another embodiment for synthesizing layered hydroxides embedded in a support material.

In one method of fabricating PLH embedded in a porous support, the PLH material is synthesized within a conductive support as shown in FIG. 19. A conductive support is added to the precursor solution of NaOH prior to injection of the salts to form the LHs material. The LH material is synthesized within the conductive porous material. In this case the conductive support can have a smaller uniform pore size (e.g., 20 nm) with a tight pore size distribution to maximize surface-area to volume ratio. The walls of the porous conductive support material may contain nucleation sites (i.e., functional groups, thin (oxy-)hydroxide coating, defects) to facilitate LH formation.

In one embodiment, the LH material includes cross-linking between one or more layers. For example, cross linking may be accomplished through the use of polymeric ligands. Materials used to facilitate such crosslinking include, in some embodiments, 1) multifunctional organic molecules with two or more —OH reactive/complexing groups (e.g., thiols, acyl chlorides, carboxylic acids, etc.), 2) metal organic precursors with a metal in a valence state >1 (e.g., metal carbonyls, metal halides, metal alkylamides, metal diketonates), and 3) Polymerization reactions.

In another embodiment, a LH material is used as a flow electrode. For example, LH nanoparticles may be a flow electrode. For such embodiment, the particles can be larger LH particles themselves could be larger, or LH particles could be incorporated into larger particles (as described above). Smaller LH particles should give rise to faster charging and higher efficiency because it limits the length scale over which bulk ion diffusion must take place.

In one embodiment, as particulate flow electrodes, the LH or LH containing particles are blended with the electrolyte to make an anode-electrolyte mixture, or anolyte. LH anolyte is pumped from a reservoir through one half (the anolyte chamber) of a flow cell which comprises a metal current collector and an ion-conducting boundary which interfaces with the cathode-electrolyte or catholyte chamber of the flow cell, which has an analogous construction. A bias is either (1) applied across the anolyte and catholyte current collectors to charge the cell or (2) drawn from the current collectors to power a load during discharge. For energy storage only, the LH anolyte can be (1) paired with an LH catholyte to make an anion based battery or (2) paired with a cation-based catholyte to make a cation-anion hybrid cell. In order to perform water desalination or other industrial ion removal process (in addition to energy storage), one or more electrolyte flow chambers can be added between the catholyte chamber and anolyte chamber. With one electrolyte flow chamber, ions are removed from the influent electrolyte and are incorporated into the catholytes and anolytes during charging. A second flow cell can be connected with the same anolyte and catholyte streams and used to discharges the anolyte and catholyte and produce a stream of concentrated ions. Using two electrolyte flow chambers, the LH anolyte flows through both the catholyte and anolyte flow chambers, and under applied bias cations and anions collect in one of the flow chambers, leaving the other flow chamber with low ion concentrations.

In another embodiment, the isolated LHs are provided as a 2-d material. For example, isolated Single or Few Layer LH/LDHs (i.e., 2D) can be utilized for surface redox reactions. Single layer or few layer LHs are exfoliated, for example by anion exchange with sequentially larger anions to drive the layers apart. The advantage of a single or few layer LH is that the electrochemical anion complexation can occur at the top surface of the LH, eliminating (or reducing) slow anion diffusion through the interplanar space of bulk LH particles, providing higher rate and higher efficiency devices. These single/few layer LHs can be used in each of the above embodiments. For example, single layer LHs can be cross-linked onto conductive supports or used as anolytes or catholytes in flow batteries. In one embodiment, the few layer means 5 layers or less.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An ion insertion device comprising:
a cation electrode; and
an anion electrode comprising a layered hydroxide, wherein the layered hydroxide has the formula $(M^1)_x(M^2)_y(M^3)_z \ldots (OH)_6A$, where M is the cation and A is the anion, with $M^1, M^2, M^3 \ldots$ each being different and further wherein x, y, and z are whole numbers and x is equal to one or more, and
further wherein the layered hydroxide comprises polymeric ligands crosslinked to layers within the layered hydroxide.

2. The device of claim 1, wherein the anion electrode is a poly-layered hydroxide wherein y is equal to one or more and z is equal to one or more.

3. The device of claim 1, wherein the anion electrode is a poly-layered hydroxide wherein one of y and z is equal to zero and the other is equal to one or more.

4. The device of claim 1, wherein the anion electrode is a mono-layered hydroxide wherein y and z are zero.

5. The device of claim 1, wherein M is selected from the group consisting of $1^+$ materials, $2^+$ materials, and $3^+$ materials.

6. The device of claim 5, wherein the 6 wherein a ratio of $2^+$ materials to $3^+$ materials is between 1:0 and 1:2.

7. The device of claim 1, wherein cation of the layer hydroxide comprises at least one redox metal and at least one structural metal.

8. An ion insertion device comprising:
a cation electrode; and
an anion electrode comprising a layered hydroxide, wherein the layered hydroxide has the formula $(M^1)_x(M^2)_y(M^3)_z \ldots (OH)_6A$, where M is the cation and A is the anion, with $M^1, M^2, M^3 \ldots$ each being different and further wherein x, y, and z are whole numbers and equal to one or more,
wherein the layered hydroxide comprises polymeric ligands crosslinked to layers within the layered hydroxide.

9. The device of claim 8, wherein the anion electrode is a flow electrode and further wherein the anion electrode is contained within a housing.

10. The device of claim 8, wherein M is selected from the group consisting of $1^+$ materials, $2^+$ materials, and $3^+$ materials.

11. The device of claim 10, wherein M is selected from the group consisting of Ca, Cd, Cu, Li, Mg, Mn, Ni, Zn Al, Cr, Fe, V, and Co.

12. The device of claim 11, wherein a ratio of 2+ materials to 3+ materials is greater than 1:0.

13. The device of claim 11, wherein a ratio of 2+ materials to 3+ materials is between 1:0 and 1:2.

14. The device of claim 8, wherein cation of the layer hydroxide comprises at least one redox metal and at least one structural metal.

15. The device of claim 14, wherein the redox metal to structural metal ratio is between 1:5 and 4:5.

16. The device of claim 14, wherein the redox metal is between 50% and 100% of the total amount of cation.

* * * * *